United States Patent [19]
Yada et al.

[11] Patent Number: 5,804,118
[45] Date of Patent: Sep. 8, 1998

[54] MOLDING AND METHOD OF PRODUCING THE SAME

[75] Inventors: Yukihiko Yada; Kazuyoshi Higuchi, both of Oobu, Japan

[73] Assignee: Tokai Kogyo Kabushiki Kaisha, Oobu, Japan

[21] Appl. No.: 637,172

[22] Filed: Apr. 24, 1996

Related U.S. Application Data

[62] Division of Ser. No. 130,392, Oct. 1, 1993, Pat. No. 5,534, 316, which is a division of Ser. No. 781,374, Oct. 23, 1991, Pat. No. 5,281,291.

[30] Foreign Application Priority Data

Oct. 24, 1990 [JP] Japan .................................... 2-286708
Nov. 8, 1990 [JP] Japan .................................... 2-304884

[51] Int. Cl.$^6$ ........................................................ D01D 5/20
[52] U.S. Cl. .................. 264/167; 264/177.1; 264/177.2; 52/708; 52/400; 52/716.5
[58] Field of Search ............................. 49/479, 373, 374, 49/488, 490; 296/93, 201, 208; 52/208, 400, 716, 397, 402, 403, 718.1, 716.2, 716.4, 716.5; 264/177.1, 177.2, 167, 40.7, 177.17, 117.1

[56] References Cited

U.S. PATENT DOCUMENTS

| | | | |
|---|---|---|---|
| 4,894,954 | 1/1990 | Nozaki et al. | 49/479 |
| 4,963,403 | 10/1990 | Roberts et al. | 428/31 |
| 5,139,302 | 8/1992 | Kauke | 296/93 |
| 5,174,624 | 12/1992 | Yada et al. | 296/93 |
| 5,344,205 | 9/1994 | Yada et al. | 296/93 |
| 5,523,041 | 6/1996 | Yada | 264/167 |

*Primary Examiner*—Merrick Dixon
*Attorney, Agent, or Firm*—Oblon, Spivak, McClelland, Maier & Neustadt, P.C.

[57] ABSTRACT

A molding with the cross-section thereof varying in the longitudinal direction. The molding includes: a support strip; and a protector provided along the length of the support strip so as to bring the molding into contact with a window glass; the support strip including a mounting portion, an outer piece with the height thereof varying along the length of the support strip and a top portion for connecting the mounting portion and the outer piece; and the protector being integrally provided with the outer piece of the support strip at the lower portion thereof by extrusion molding.

19 Claims, 25 Drawing Sheets

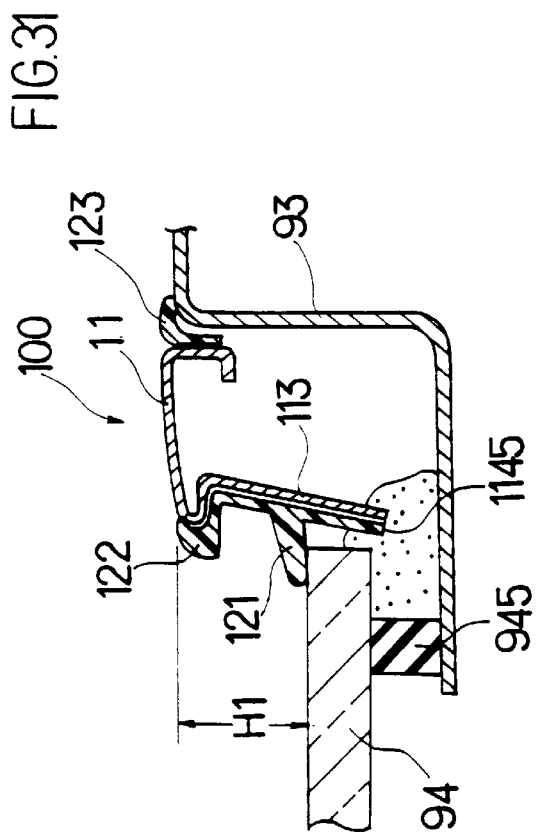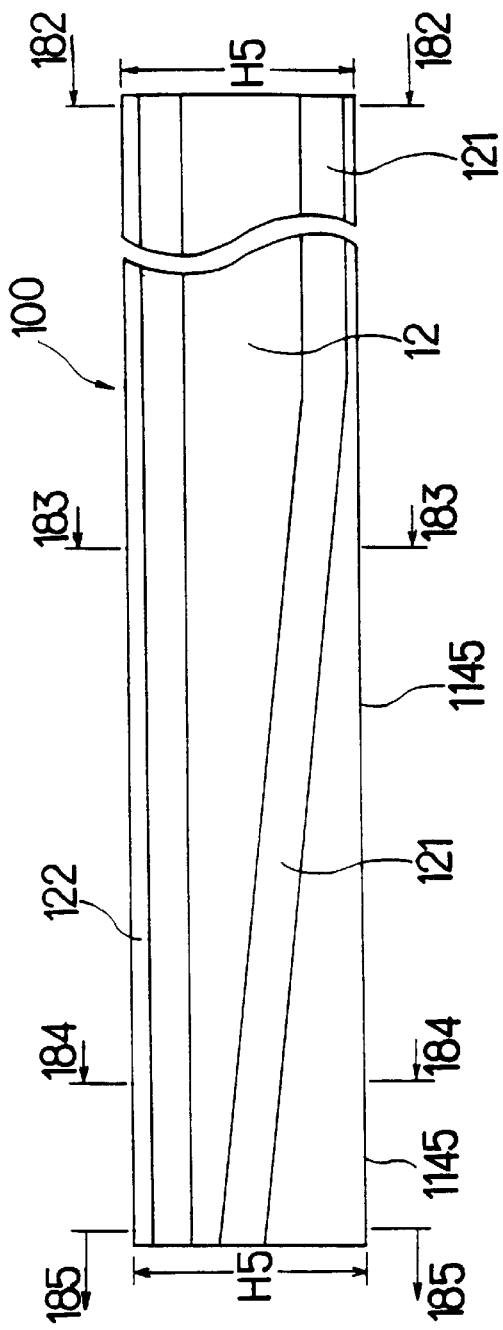

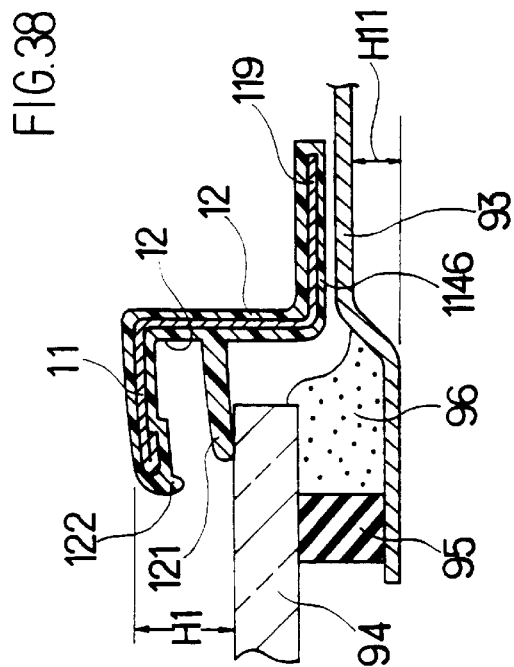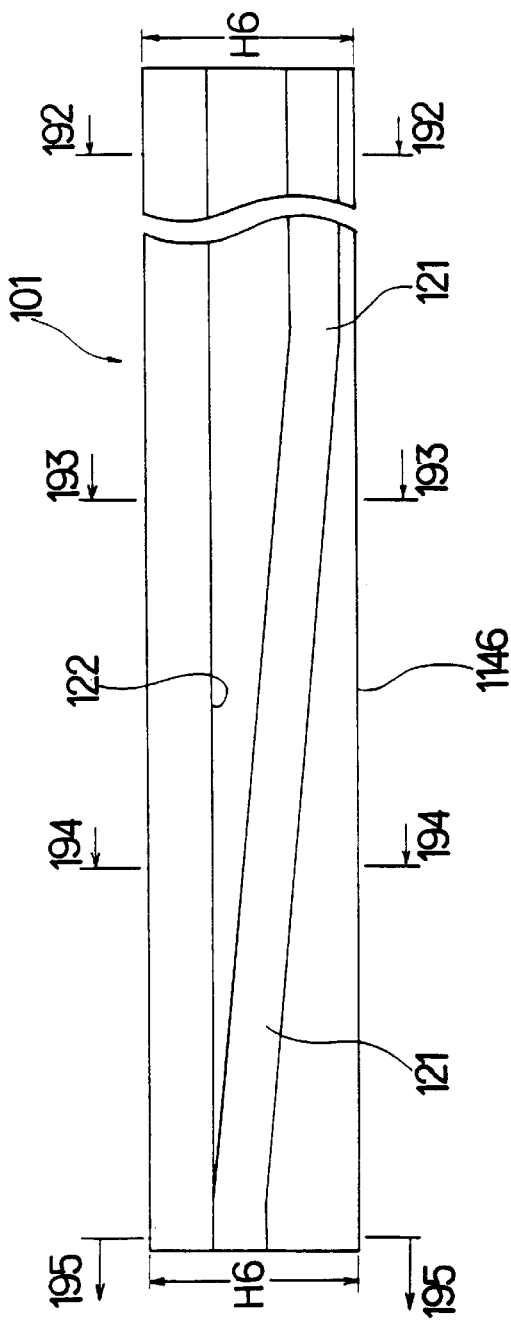

5,804,118

MOLDING AND METHOD OF PRODUCING THE SAME

This is a division of application Ser. No. 08/130,392 filed on Oct. 1, 1993, now U.S. Pat. No. 5,534,316, which is a division of application Ser. No. 07/781,374 filed on Oct. 23, 1991, now U.S. Pat. No. 5,281,291.

BACKGROUND OF THE INVENTION

1. Field of the Invention

The present invention relates to a molding for vehicles and, more particularly, to a molding with the cross-section thereof varying in the longitudinal direction and a method of producing such a molding.

2. Description of the Related Art

In automobiles, moldings such as a window molding 91 and a door outer molding 92 are generally mounted, as shown in FIG. 44. The window molding 91 is mounted along the border pillar 93 and a window glass 94. The door outer molding 92 is mounted along the border between a door 95 and a door glass 96.

Each of these moldings is composed of a support strip and resin portions, as will be described later, and a protector is provided in the longitudinal direction of the support strip. (See, for example, Japanese Utility Model Publication Nos. 31531/1986 and 14488/1989.)

As shown in FIG. 45, a conventional molding 97 is provided with a support strip 98 and a protector 99 of a synthetic resin which is provided in the longitudinal direction of the support strip 98. The support strip 98 is composed of a mounting portion 981, an outer piece 983 and a top portion 982 which connects the mounting portion 981 and the outer piece 983. The support strip 98 is provided with a lip 993 at the mounting portion 981 and a water guide 992 at the upper portion of the outer piece 983. The outer piece 983 in this molding 97 has the same height at any portion. In other words, the section of the molding 97 has the same configuration at any portion in the longitudinal direction.

The protector 99 comes into contact with the window glass 94 when it is mounted on the pillar 93 of the vehicle body, as shown in FIG. 45, so that the protector 99 has a sealing function for preventing raindrops on the window glass 94 from entering the inside of the car. In FIG. 45, the reference numeral 945 denotes a sealing rubber provided between the pillar 93 and the window glass 94.

In order to produce the molding 97, the protector 99, the lip 993 and the water guide 992 are integrally provided with the support strip 98 having a substantially U-shaped cross-section by insert extrusion.

With a view to improving the function of shedding rainwater on the window glass 94 and improving the design of the molding, a molding 970 such as those shown in FIGS. 46 to 49 is used in which the height of the outer piece 983 is varied along the length of the molding 970. The shape of the cross-section of the molding 970 is varied along the length of the molding 970, as shown in FIGS. 47 to 49. The height of the outer piece 98 of the support strip 98 is also varied.

When the molding 970 is produced, the support strip 98 having a substantially U-shaped cross-section is first prepared, and the water guide 992 and the lip 993 are integrally provided with the support strip 98 by insert extrusion. A part (lower portion) of the outer piece 983 of the support strip 98 is thereafter cut away so that the height of the outer strip 983 is, continuously decreased. A protector 991 which has been produced separately from the molding 970 is bonded to the lower end portion of the outer piece 983.

In the above-described conventional method of producing a molding, since it is necessary to produce the protector 991 separately from the molding 970 and to bond the protector 991 with the molding 970, the number of steps is increased, resulting in the rise in the cost. When the protector 991 is bonded with the molding 970, the deviation in the longitudinal position of the protector 991 and the overflow of the adhesive may be caused, which aesthetically impair the design of the molding.

The molding 970 may be produced by disposing the support strip 98 having various shapes of cross-sections in the injection molding die, and integrally molding the protector, lip and water guide with the support strip 98 by injection molding.

In the case of producing a long molding by this method, however, a large-sized injection molding die is required, which leads to a high manufacturing cost. In addition, since a burr is produced between the molding and the protector, the aesthetic external appearance of the molding is impaired.

SUMMARY OF THE INVENTION

Accordingly, it is an object of the present invention to eliminate the above-described problems in the related art and to provide a molding which allows a protector to be integrally formed therewith along the lower portion of the outer piece with the height thereof varying without impairing the anesthetic external appearance and which is easy to manufacture, and to provide a method of producing such a molding which facilitates the production of a molding.

To achieve this aim, the present invention provides a molding with the cross-section thereof varying in the longitudinal direction, the molding comprising: a support strip; and a protector provided along the length of the support strip so as to bring the molding into contact with a window glass; the support strip including a mounting portion, an outer piece with the height thereof varying along the length of the support strip and a top portion for connecting the mounting portion and the outer piece; and the protector being integrally provided with the outer piece of the support strip at the lower portion thereof by extrusion molding.

Other features and advantages of the present invention will be apparent from the following description and the accompanying drawings.

BRIEF DESCRIPTION OF THE DRAWINGS

FIGS. 1 to 12 show a first embodiment of a molding according to the present invention and a method of producing the same, wherein FIG. 1 is a perspective view of a molding;

FIG. 2 is a sectional view of the molding shown in FIG. 1, taken along the line A—A;

FIG. 3 is a sectional view of the molding shown in FIG. 1, taken along the line B—B;

FIG. 4 is a sectional view of the molding shown in FIG. 1, taken along the line C—C;

FIG. 5 is a sectional view of the molding shown in FIG. 1, taken along the line D—D;

FIG. 6 is a perspective view of the molding shown in FIG. 1 in the state of being mounted on the front window of an automobile;

FIG. 7 is a perspective view of a metal sheet partially coated with a protective film;

FIG. 8 is a perspective view of a support strip having a constant cross-section produced by continuous forming of a metal sheet;

FIG. 9 is a perspective view of the support strip shown in FIG. 8 with an adhesive applied in advance to the molding position of resin portions;

FIG. 10 is a perspective view of the support strip having the resin portions integrally provided therewith by extrusion molding;

FIG. 11 is a perspective view of the molding having the lower portion of the outer piece cut away along the protector of the extrusion molded molding member;

FIG. 12 is a side elevational view of an extrusion molding die;

FIGS. 13 to 26 show a second embodiment of a molding according to the present invention and a method of producing the same, wherein FIG. 13 is a perspective view of a molding;

FIG. 14 is a sectional view of the molding shown in FIG. 13, taken along the line E—E;

FIG. 15 is a sectional view of the molding shown in FIG. 13 taken along the line F—F;

FIG. 16 is a sectional view of the molding shown in FIG. 1, taken along the line G—G;

FIG. 17 is a perspective view of a metal sheet partially coated with a protective film;

FIG. 18 is a perspective view of the metal sheet shown in FIG. 17 with an adhesive applied in advance to the molding positions of resin portions;

FIG. 19 is a perspective view of a support strip having a constant cross-section produced by continuous forming of a metal sheet;

FIG. 20 is a perspective view of the support strip with the resin portions integrally provided therewith by extrusion molding;

FIG. 21 is a sectional view of the molding shown in FIG. 20, taken along the line I—I;

FIG. 22 is a perspective view of the molding having the lower portion of the outer piece cut away along the protector of the extrusion molded molding member;

FIG. 23 is a sectional view of the molding shown in FIG. 22, taken along the line J—J;

FIG. 24 is a perspective view of the molding shown in FIG. 20 with the protector bent in such a manner as to be engaged with the lower portion of the outer piece;

FIG. 25 is a section view of the molding shown in FIG. 24, taken along the line K—K;

FIG. 26 is a side elevational view of an extrusion molding die;

FIGS. 27 to 29 show a third embodiment of a molding according to the present invention and a method of producing the same, wherein FIG. 27 is a perspective view of a molding;

FIG. 28 is a sectional view of the molding shown in FIG. 27, taken along the line M—M;

FIG. 29 is a perspective view of the molding shown in FIG. 27 with the protector bent in such a manner as to be engaged with the lower portion of the outer piece;

FIGS. 30 to 36 show a fourth embodiment of a molding according to the present invention and a method of producing the same, wherein FIG. 30 is a perspective view of a molding mounted to the front window;

FIG. 31 is a sectional view of the molding shown in FIG. 30, taken along the line 180—180;

FIG. 32 is a front view of the molding;

FIG. 33 is a sectional view of the molding shown in FIG. 32, taken along the line 182—182;

FIG. 34 is a sectional view of the molding shown in FIG. 32, taken along the line 183—183;

FIG. 35 is a sectional view of the molding shown in FIG. 32, taken along the line 184—184;

FIG. 36 is a sectional view of the molding shown in FIG. 32, taken along the line 185—185;

FIGS. 37 to 43 show a fifth embodiment of a molding according to the present invention and a method of producing the same, wherein FIG. 37 is a perspective view of the molding mounted to the front window;

FIG. 38 is a sectional view of the molding shown in FIG. 37, taken along the line 190—190;

FIG. 39 is a front view of the molding;

FIG. 40 is a sectional view of the molding shown in FIG. 39, taken along the line 192—192;

FIG. 41 is a sectional view of the molding shown in FIG. 39, taken along the line 193—193;

FIG. 42 is a sectional view of the molding shown in FIG. 39, taken along the line 194—194; and FIG. 43 is a sectional view of the molding shown in FIG. 39, taken along the line 195—195;

FIGS. 44 to 49 show conventional moldings, wherein FIG. 44 is a perspective view of an automobile with a molding mounted thereon;

FIG. 45 is a perspective view of the molding shown in FIG. 44 mounted on the automobile; and FIGS. 46 to 49 show another conventional molding with the cross-section thereof varying in the longitudinal direction, wherein FIG. 46 is a side elevational view thereof; and FIGS. 47 to 49 are sectional views thereof, taken along the lines X—X, Y—Y and Z—Z, respectively.

DETAILED DESCRIPTION OF THE INVENTION

The present invention provides a molding with the cross-section thereof varying in the longitudinal direction, the molding comprising: a support strip; and a protector provided along the length of the support strip so as to bring the molding into contact with a window glass; the support strip including a mounting portion, an outer piece with the height thereof varying along the length of the support strip and a top portion for connecting the mounting portion and the outer piece; and the protector integrally provided with the outer piece of the support strip at the lower portion thereof by extrusion molding.

The most characteristic feature of the present invention lies in that the height of the outer piece of the support strip is varied along the length of the support strip and in that the protector is integrally provided with the outer piece of the support strip at the lower portion thereof by extrusion molding.

In a molding of the present invention, the protector is, firmly and integrally provided with the outer piece of the support strip along the lower portion thereof. The protector, lip and water guide are made of a synthetic resin such as a vinyl chloride resin, an ionomer resin and synthetic rubber.

Figure 1:
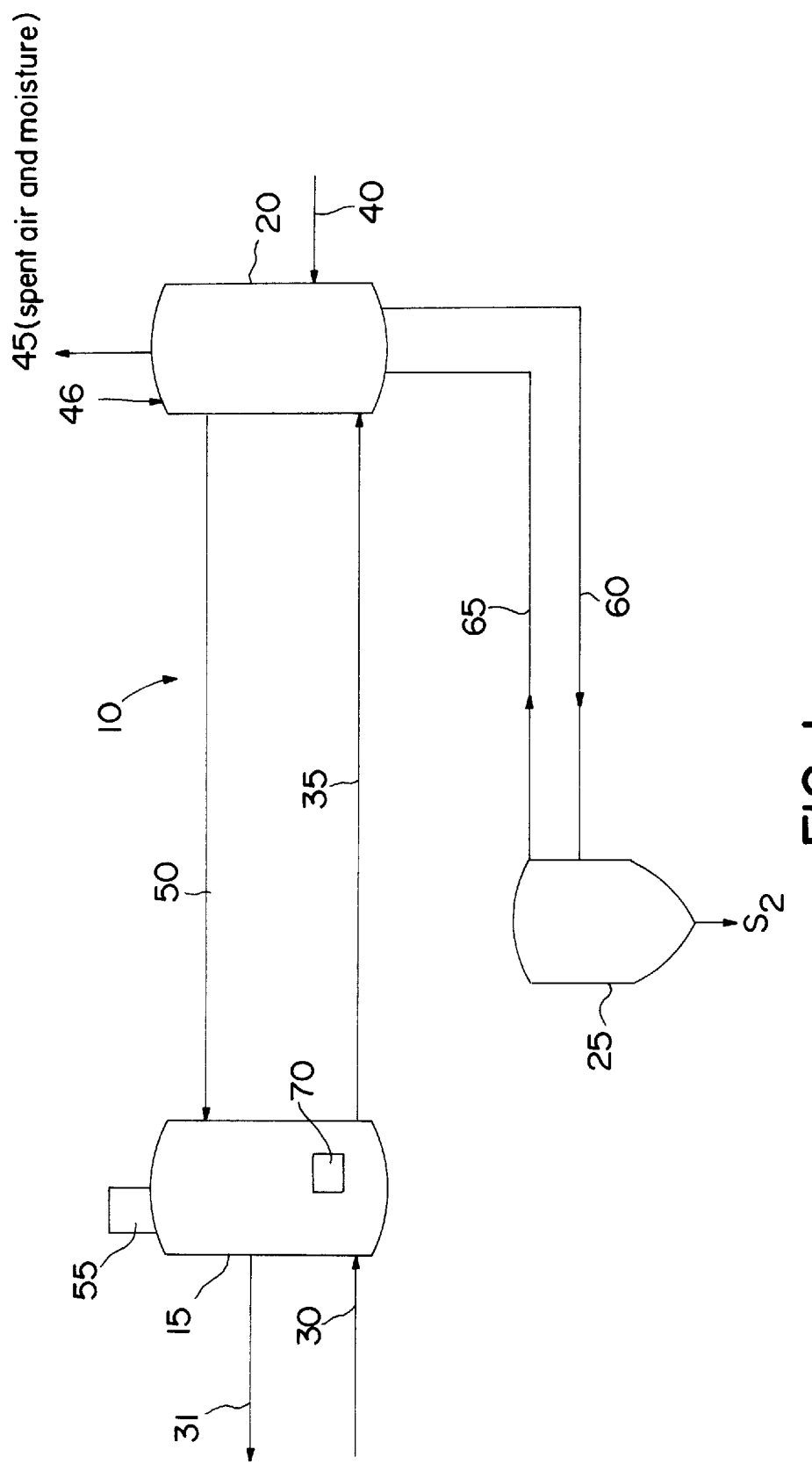

For the support strip, steel sheet, stainless steel sheet, aluminum sheet, etc. are usable. The lower portion of the support strip is preferably bent inwardly into the form of an L, as shown in FIG. 1. A contacting portion 114 which is integrally formed with the molding and comes into contact with a window glass surface is preferably provided, as shown in FIG. 1. This contacting portion improves the sealing property for the gap between the molding and the window glass and also prevents the window glass from being damaged.

In a molding of the present invention, the width of the top portion as well as the height of the outer piece of the support strip may be varied along the length of the support strip.

A method of producing a molding including a support strip having an outer piece with the height thereof varying along the length of the support strip and a protector provided at the lower portion of the support strip comprises the steps of: forming a support strip having a constant cross-section by a continuous forming of a metal sheet having a constant width; integrally extrusion molding a protector by an extrusion molding die having a main die and a sub die which is movable along one side of the extrusion orifice so as to mold the protector, while moving the sub die so as to vary the molding position for the protector in the longitudinal direction of the support strip with respect to the outer piece of the support strip; cutting the extruded molding member to a predetermined length; and cutting a part of the outer piece of the support strip off from the molding member along the protector.

The most characteristic feature of the method of producing a molding according to the present invention is that a support strip having a constant cross-section is prepared in advance, the protector is integrally extrusion molded with the outer piece of the support strip by an extrusion die, and the molding member and a part of the lower portion of the outer piece are cut. It is also characteristic of the method of the present invention that the extrusion die used for extrusion molding has a main die and a sub die which is movable along one side of the extrusion orifice so as to mold the protector.

Figure 12:
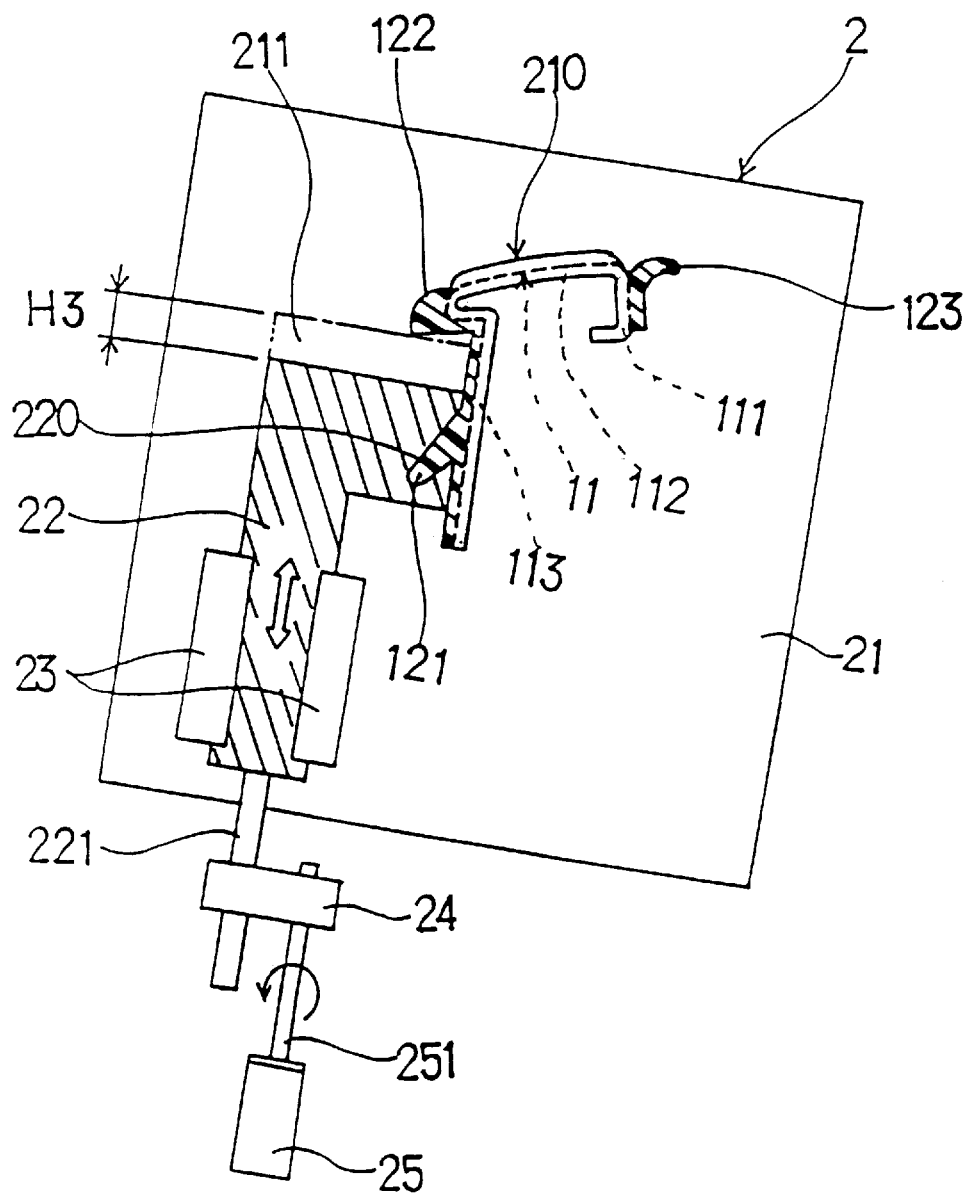

The base of the main die has a shape corresponds to the cross-section of the support strip and the lip, the water guide, etc. which are formed on the outside of the support strip. The sub die has a base for molding the protector at the position outside of the outer piece of the support strip. By moving the position of the base for molding the protector, the molding position for the protector is varied, as shown in FIG. 12.

In this way, the lip, the water guide and the protector are simultaneously and integrally provided with the support strip. The outer piece at the lower portion of the protector is cut off the insert extruded product obtained in this way, thereby producing a molding of the present invention with the cross-section thereof varying in the longitudinal direction.

The method of producing a molding will be explained in more detail in the following.

A support strip having a constant cross-section is first formed by a continuous forming of a metal sheet having a constant width.

A protector is then integrally formed with an outer piece of the support strip by extrusion molding using an extrusion die. In this case, an extrusion die having a main die and a sub die which is movable along one side of the extrusion orifice so as to mold the protector is used. While moving the sub die so as to vary the position of the protector along the length of the support strip, the protector is integrally molded by extrusion molding.

The extrusion molded molding member is cut to a predetermined length.

The lower portion of the outer piece of the support strip is cut off from the molding member along the protector. In this way, the molding having a support strip with the height of the outer piece thereof varying along the length of the support strip and a protector provided at the lower portion of the outer piece is obtained. In other words, the molding with the cross-section varying in the longitudinal direction and having a protector at the lower portion of the outer piece is obtained.

Figure 9:
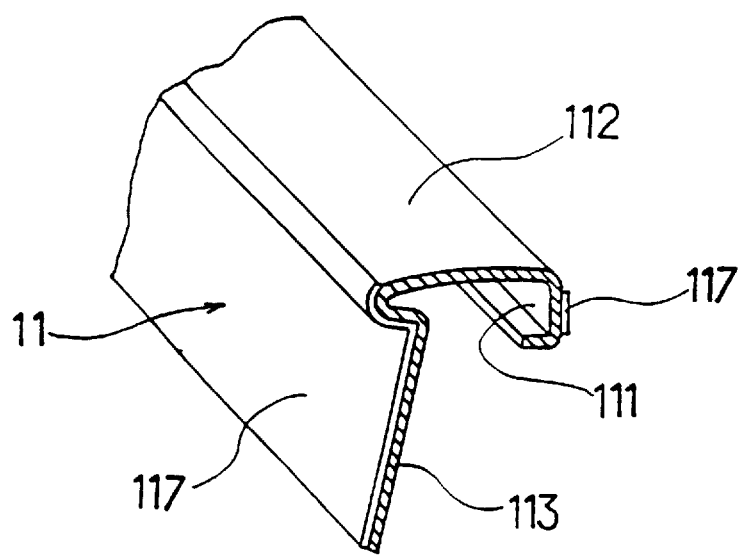

It is preferable to apply an adhesive such as an acrylic resin and a phenol resin to the portion of the outer surface of the support strip which is integrally molded with the protector and the like prior to extrusion molding, as shown in FIG. 9.

The molding of the present invention has a function of shielding the window glass from rain water by virtue of the protector, as described above. Since the protector is integrally molded with the molding by extrusion molding, the protector is firmly bonded to the support metal and it is excellent from the point of view of design.

According to the method of producing a molding of the present invention, it is possible to integrally mold the protector with the support strip while gradually changing the height of the protector with respect to the outer piece of the support strip, thereby facilitating the molding of the protector. By cutting a part of the outer piece at the lower portion of the protector, it is possible to obtain a molding having various cross-sections. In this way, the manufacture of a molding is facilitated.

Thus, according to the present invention, it is possible to provide a molding which is provided with a protector integrally formed therewith along the lower portion of the outer piece with the height thereof varying without impairing the aesthetic external appearance and which is easy to manufacture, and to provide a method of producing such a molding.

The molding of the present invention may have a structure in which the protector has a protector piece integrally extrusion molded with the inner wall surface of the outer piece of the support strip and the protector piece is bent in such a manner as to be engaged with the lower portion of the outer piece, as shown in FIGS. 13 to 29.

In the molding, the height of the outer piece of the support strip is varied along the length of the support strip and the protector piece is integrally extrusion molded with the inner wall surface of the outer piece. The protector piece is bent and engaged with the lower portion of the outer piece, thereby forming the protector.

In this molding, the protector is integrally formed with the support strip in such a manner as to be firmly engaged with the lower portion of the outer piece of the support strip.

A steel sheet, stainless steel sheet, aluminum sheet, etc. are usable for the support strip. If a stainless steel sheet is used, it is possible to form a "shining ornamental surface" on the surface of the support strip. In the molding, the protector piece is formed on the inner surface of the outer piece and the protector piece is engaged with the lower portion of the outer piece, thereby forming the protector. It is therefore easy to form a "shining ornamental surface" on the outer wall surface of the outer piece.

Figure 13:
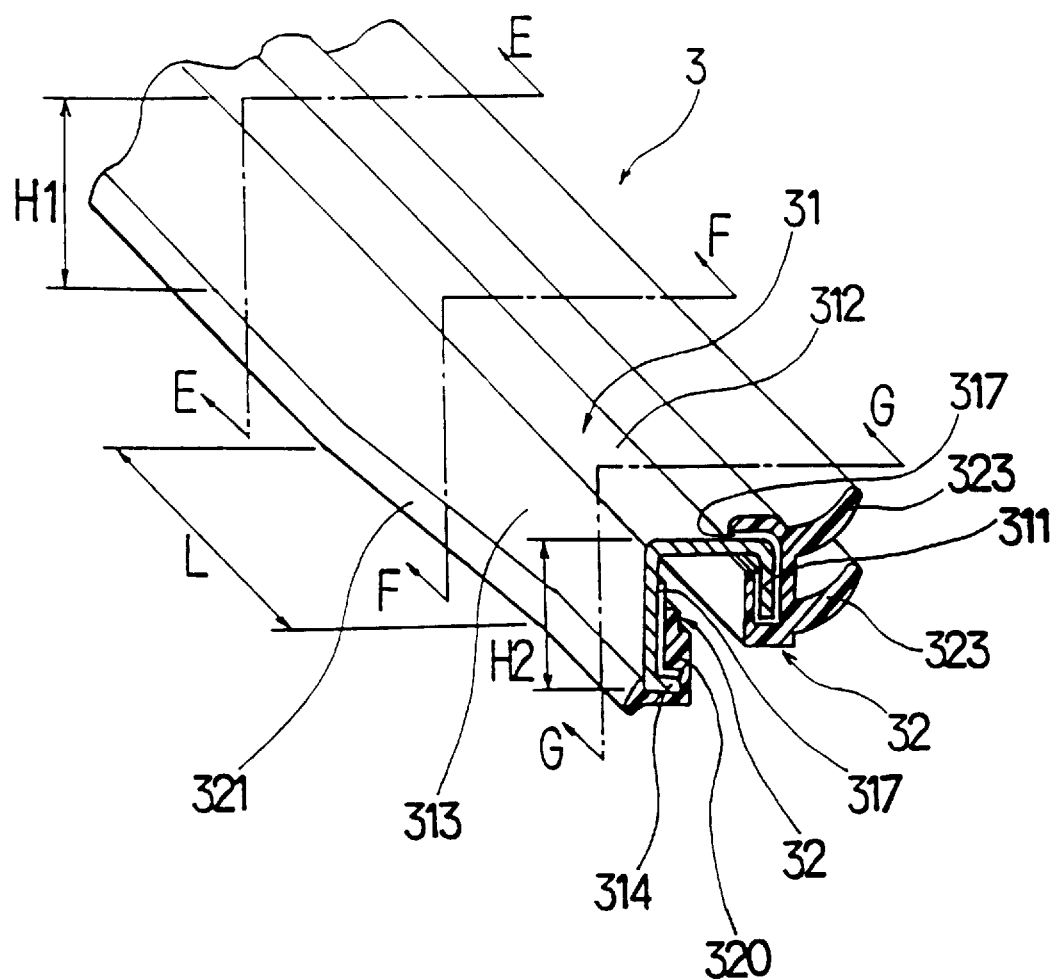
Figure 14:
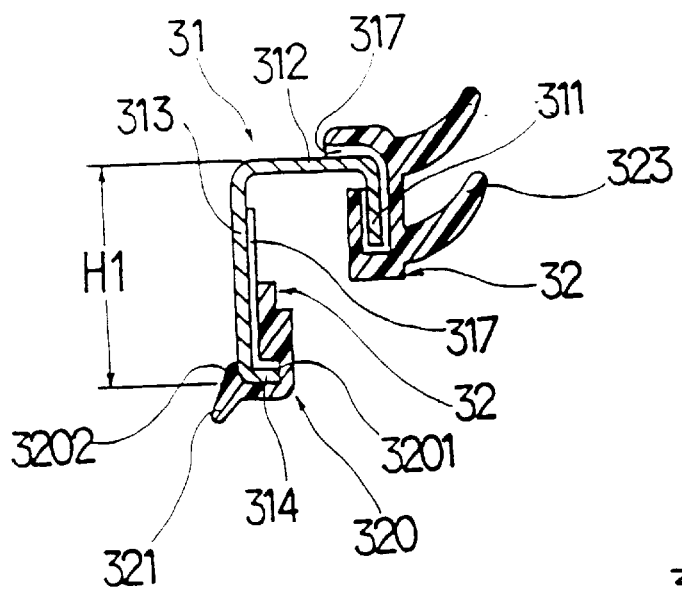
Figure 15:
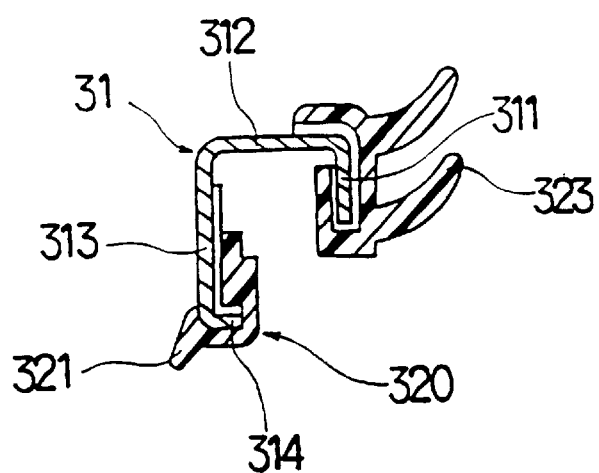

The lower portion of the outer piece of the support strip is preferably bent inwardly into the form of an L, as shown in FIG. 13. At the lower end portion of the outer piece bent in this manner is formed an engaging bent portion which engages the protector piece. It is preferable that the protector piece is provided with an engaging groove portion which engages with the engaging bent portion so as to regulate the vertical movement of the protector piece and a protector portion which regulates the horizontal movement of the protector piece in cooperation with the engaging groove portion, as shown in FIGS. 14 and 15.

Figure 28:
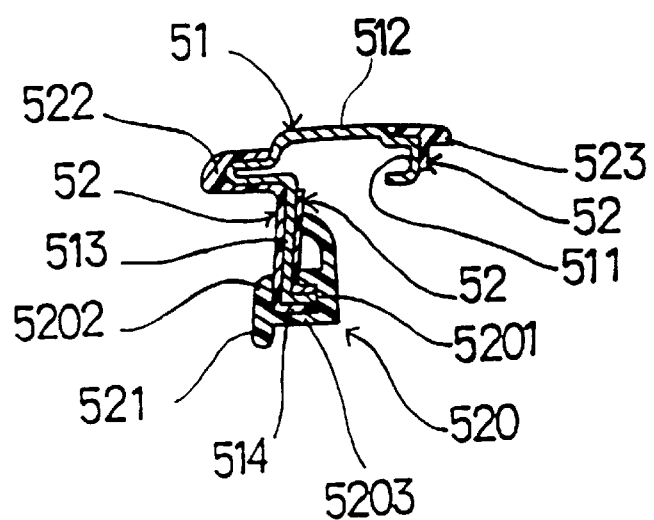

The protector piece is also preferably provided with a contacting member in correspondence with the undersurface of the engaging bent portion, as shown in FIG. 28. The contacting member improves the sealing property for the gap between the molding and the window glass and also prevents the window glass from being damaged.

In a molding of the present invention, the width of the top portion of the outer piece as well as the height of the outer piece may be varied along the length of the support strip.

A method of producing a molding including a support strip having an outer piece with the height thereof varying along the length of the support strip and a protector provided at the lower portion of outer piece and having a protector piece comprises the steps of: forming a support strip having a constant cross-section by a continuous forming of a metal sheet having a constant width; integrally extrusion molding the protector piece by an extrusion molding die having a main die and a sub die which is movable along one side of the extrusion orifice so as to mold the protector, while moving the sub die so as to vary the molding position for the protector piece in the longitudinal direction of the support strip with respect to the inner wall surface of the outer piece of the support strip; cutting the extrusion molded molding member to a predetermined length; cutting a part of the outer piece of the support strip off from the molding member along the protector piece; and bending the protector piece in such a manner as to be engaged with the lower portion of the outer piece, thereby forming the protector.

The most characteristic feature of this method of producing a molding according to the present invention is that a support strip having a constant cross-section is prepared in advance, the protector piece is integrally extrusion molded with inner wall surface of the outer piece of the support strip by an extrusion die, and the molding member and a part of the lower portion of the outer piece are cut. It is also characteristic of the method of the present invention that the extrusion die used for extrusion molding has a main die and a sub die which is movable along one side of the extrusion orifice so as to mold the protector piece.

Figure 26:
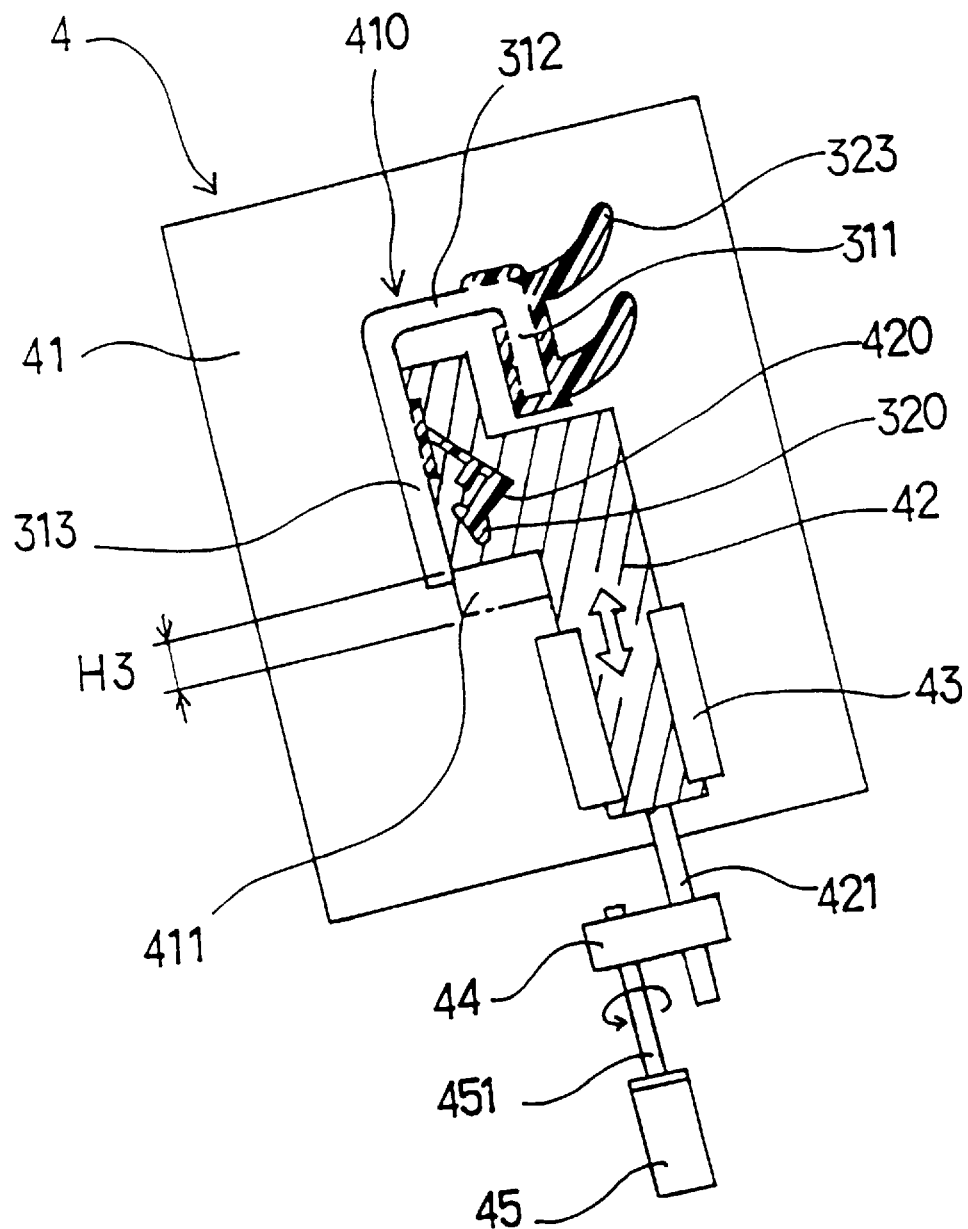

The base of the main die has a shape corresponds to the cross-section of the support strip and the lip, the water guide, etc. which are formed on the outside of the support strip. The sub die has a base for molding the protector piece at the position inside of the outer piece of the support strip. By moving the position of the base for molding the protector piece, the molding position for the protector piece is varied, as shown in FIG. 26.

In this way, the lip, the water guide and the protector are simultaneously and integrally provided with the support strip. The outer piece at the lower portion of the protector piece is cut off the insert extruded product obtained in this way, and the protector piece is bend in such a manner as to be engaged with the lower portion of the protector piece, thereby producing a molding of the present invention with the cross-section thereof varying in the longitudinal direction.

The method of producing a molding will be explained in more detail in the following.

A support strip having a constant cross-section is first formed by a continuous forming of a metal sheet having a constant width.

A protector piece is then integrally formed with the inner wall surface of an outer piece of the support strip by extrusion molding using an extrusion die. In this case, an extrusion die having a main die and a sub die which is movable along one side of the extrusion orifice so as to mold the protector piece is used. While moving the sub die so as to vary the position of the protector piece along the length of the support strip with respect to the inner wall surface of the outer piece of the support strip, the protector piece is molded by extrusion molding.

The extrusion molded molding member is cut to a predetermined length.

The lower portion of the outer piece of the support strip is cut off from the molding member along the protector piece. The protector piece is bent in such a manner as to be engaged with the lower portion of the outer piece and the protector is formed. In this way, the molding having a support strip with the height of the outer piece thereof varying along the length of the support strip and a protector provided at the lower portion of the outer piece is obtained. In other words, the molding with the cross-section varying in the longitudinal direction and having a protector at the lower portion of the outer piece is obtained. It is easy to form a "shining ornamental surface" on the outer piece of the support strip.

Figure 19:
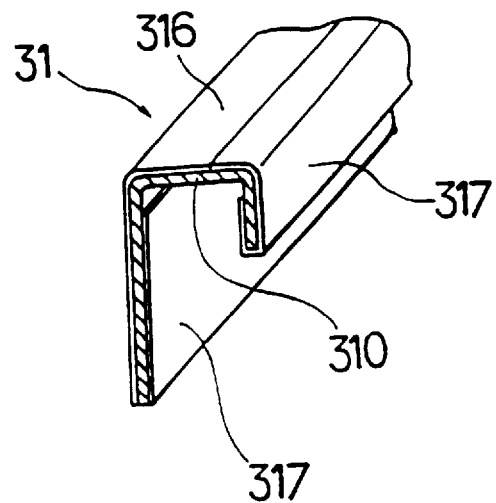

It is preferable to apply an adhesive such as an acrylic resin and a phenol resin or paste an adhesive sheet to the portion of the support strip which is integrally molded with the protector and the like prior to extrusion molding, as shown in FIG. 19.

The molding of the present invention has a function of shielding the window glass from rain water by virtue of the protector, as described above. Since the protector is integrally molded with the molding by extrusion molding, the protector is firmly bonded to the support metal and it is excellent from the point of view of design.

According to the method of producing a molding of the present invention, it is possible to integrally mold the protector with the support strip while gradually changing the height of the protector with respect to the outer piece of the support strip, thereby facilitating the molding of the protector. By cutting a part of the outer piece at the lower portion of the protector piece and engaging the protector piece with the lower portion of the outer piece, thereby forming the protector, it is possible to obtain a molding having various cross-sections. In this way, the manufacture of a molding is facilitated.

Thus, according to the present invention, it is possible to provide a molding which is provided with a protector integrally formed therewith along the lower portion of the outer piece with the height thereof varying without impairing the aesthetic external appearance and which is easy to manufacture, and to provide a method of producing such a molding.

DESCRIPTION OF THE PREFERRED EMBODIMENT

Embodiment 1

Figure 30:
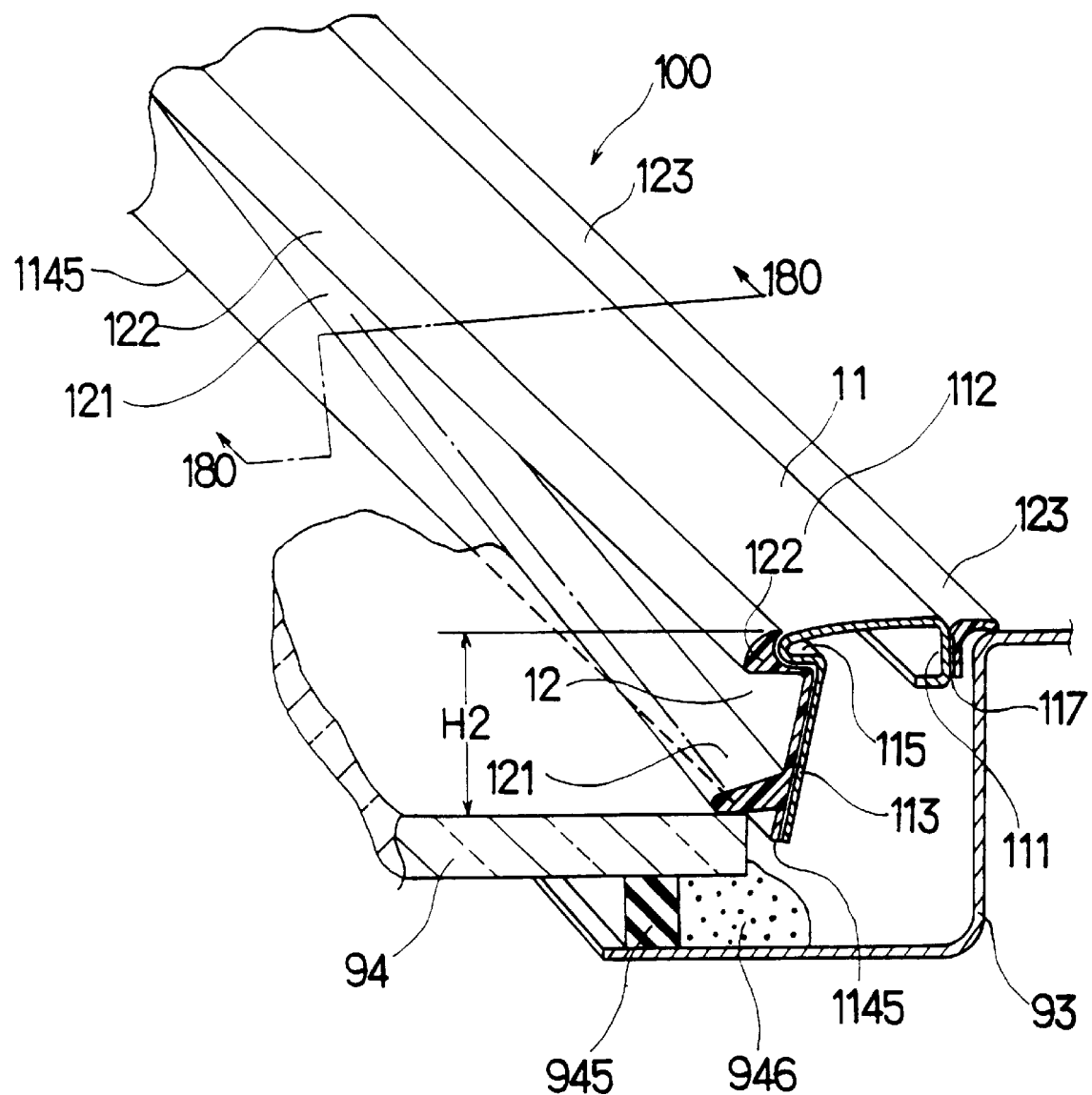
Figure 33:
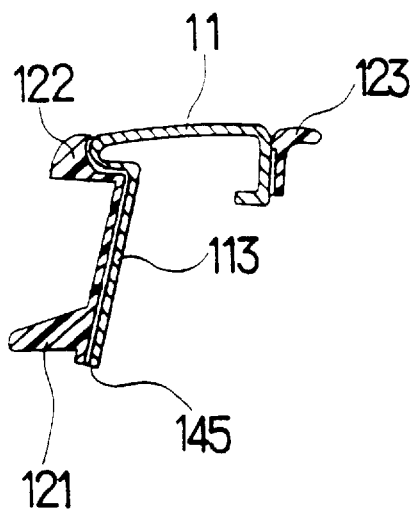
Figure 34:
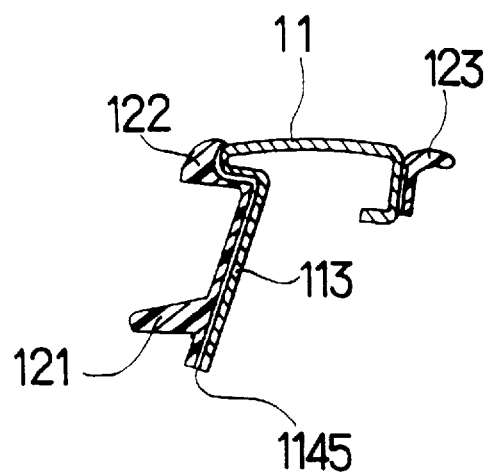
Figure 35:
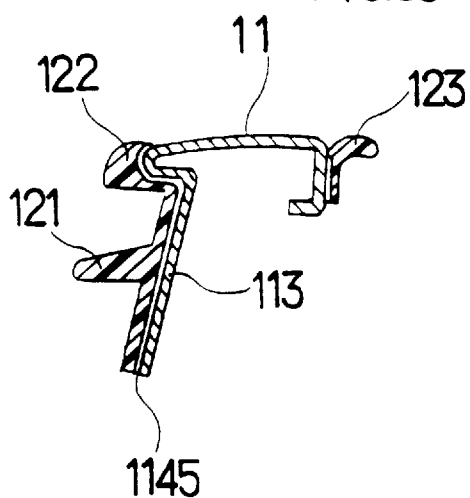
Figure 36:
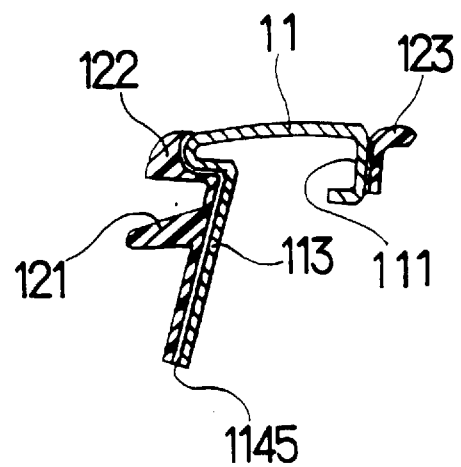

The first embodiment of a molding and a method of producing the molding according to the present invention will be explained with reference to FIGS. 1 to 12. The molding of this embodiment is applied to a window molding, as shown in FIG. 30.

The molding 1 of this first embodiment is composed of a support strip 11 and a protector 121 provided in the longitudinal direction of the support strip 11, as shown in FIG. 1. The support strip 11 is composed of a mounting portion 111, an outer piece 113 and a top portion 112 for connecting the mounting portion 111 and the outer piece 113. As shown in FIGS. 1 to 5, the height of the outer piece 113 varies along the length of the support strip 11. The protector 121 is integrally provided with the outer piece 113 of the support strip 11 at the lower portion thereof by extrusion molding.

The support strip 11 is composed of the top portion with a fixed width and the outer piece 113 having a varying height and the cross-section of the support strip 11 varies in the longitudinal direction.

Figure 2:
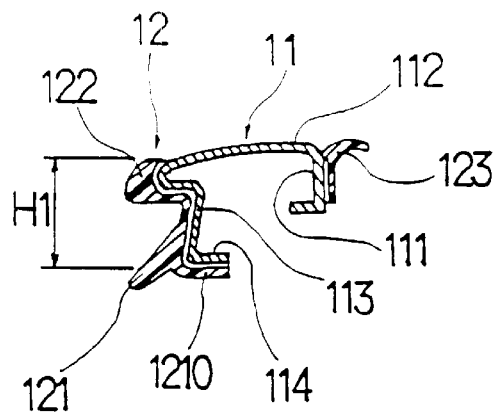
Figure 3:
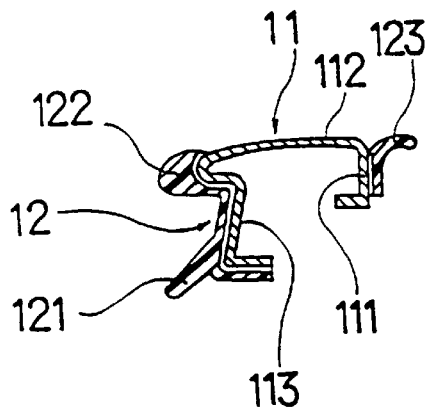
Figure 4:
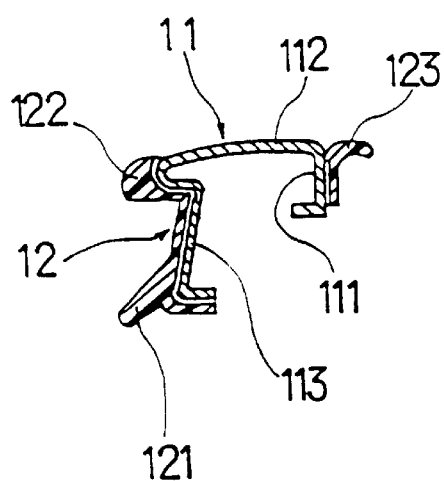
Figure 5:
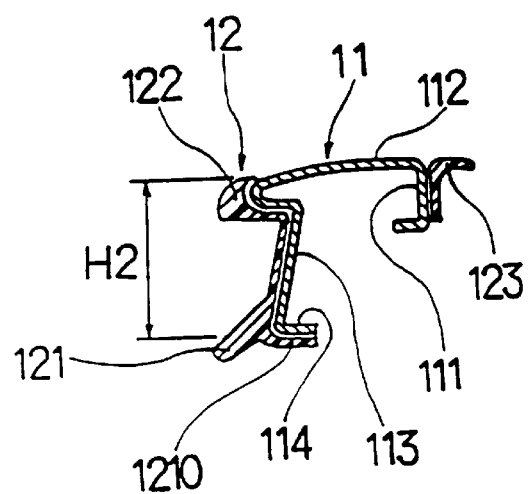

The outer piece 113 has a height of H1, as shown in FIGS. 1 and 2, a height of H2, as shown in FIGS. 1 and 5, and a height varying in the range of H1 to H2 over the length of L, as shown in FIGS. 1, 3 and 4.

The lower portion of the outer piece 113 is bent inwardly so as to form a glass contacting portion 114, and the upper portion of the outer piece 113 is bent outwardly so as to project sideways, thereby forming a guide portion 115 at which a water guide 122 is provided.

Figure 6:
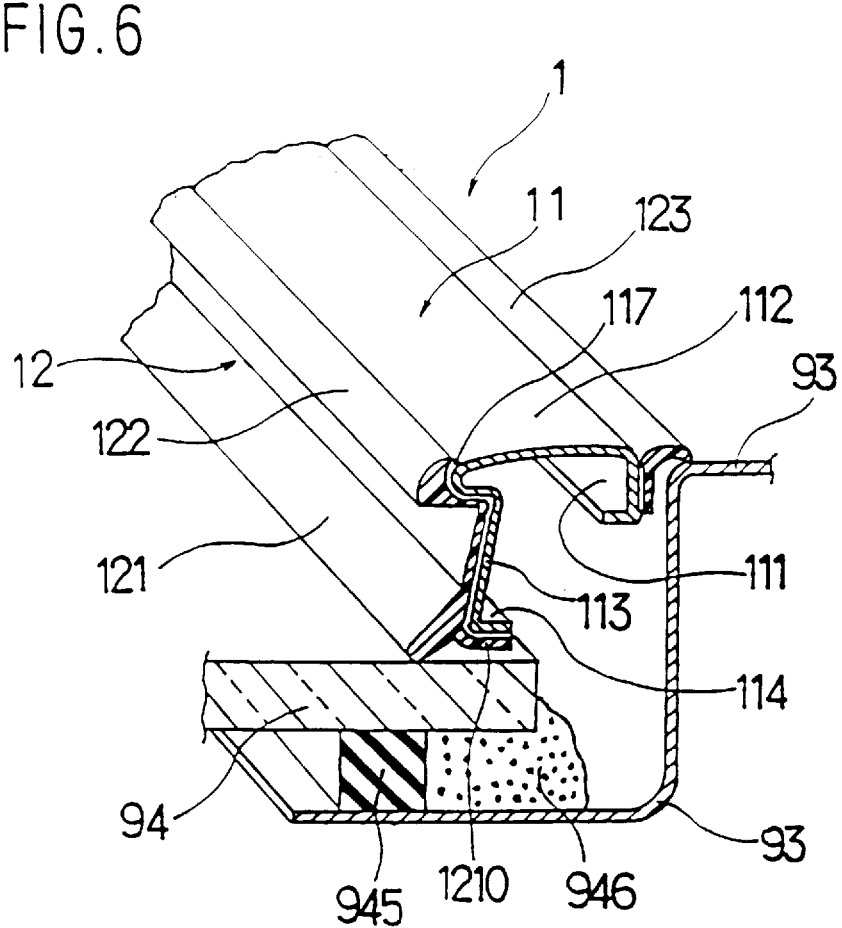

The protector 121 is provided at a resin portion 12 along the length of the support strip 11. That is, the molding 1 is composed of the support strip 11 and the resin portions 12 which are integrally extrusion molded with the surfaces of the mounting portion 111 and the outer piece 113 of the support strip 11 through an adhesive 117. A lip 123 is provided on the resin portion 12 formed on the mounting portion 111 in such a manner as to project from the support strip 11. The lip 123 is provided so as to seal the gap between the molding 1 and a pillar 93, as shown in FIG. 6.

The protector 121 and the water guide 122 are provided in such a manner as to project from the support strip 11 at the lower portion and the upper portion, respectively, of the resin portion 12 provided on the outer piece 113. The protector 121 has a function of sealing the gap between the molding 1 and a window glass 94 and preventing the direct contact between the support strip 11 and the window glass 94. The glass contacting portion 114 at the lower portion of the outer piece 113 is provided on the underside thereof with a resin plate portion 1210 integrally provided with the resin portion 12.

An extrusion die 2 used for the extrusion molding of the resin portions 12 is shown in FIG. 12. The extrusion die 2 has a main die 21 and a sub die 22 for molding a protector. The main die 21 and the sub die 22 have extrusion orifices 210, 220, respectively. The sub die 22 is movable along one side of the extrusion orifice 210 which corresponds to the outer piece 113.

The inner surface of the extrusion orifice 210 has the same shape as that of the inside of the mounting portion 111, the top portion 112 and the outer piece 113 of the support strip 11, and the outer surface of the extrusion orifice 210 has the same shape as that of the water guide 122, the lip 123, etc. of the resin portions 12. The portion between the extrusion orifice and the top portion 112 is a hollow portion.

The main die 21 has in the inside thereof a recessed portion which communicates with one side of the extrusion orifice 210. The recessed portion 211 is longer than the sub die 22 by the length which is equivalent to the amount of movement of the sub die 22. The amount H3 of movement of the sub die 22 is determined by the variation of change in the height of the outer piece 113, namely, (H2-H1).

The sub die 22 is inserted into the recessed portion 211 so as to be movable. A die guide 23 is provided between the main die 21 and the sub die 22 in the direction of the movement of the sub die 22. A feeding rod 221 is extended from the base portion of the sub die 22 in parallel to the direction of the movement of the sub die 22, and the feeding rod 221 is connected to a converter 24. The shaft 251 of a driving motor 25 is connected to the converter 24, and the converter 24 converts the rotational movement of the shaft 251 into the linear movement of the feeding rod 221. The converting mechanism may use a ball screw, for example, instead.

A method of producing the molding 1 will now be explained with reference to FIGS. 7 to 12.

Figure 7:
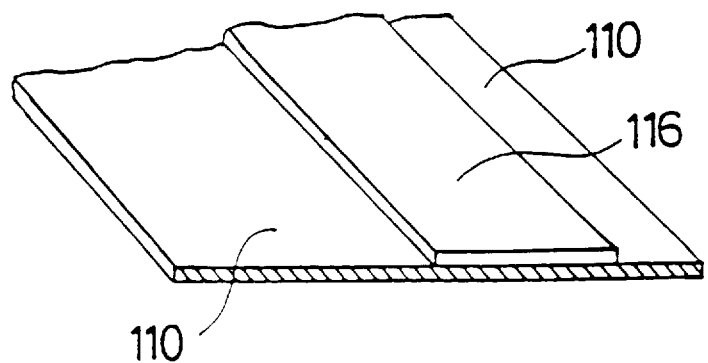

The surface of a metal sheet 110 having a constant width is first partially coated with a protective film 116 as shown in FIG. 7. The protective 116 film protects the surface of the metal sheet 110 when it is formed into the support strip 11, as shown in FIG. 8.

Figure 8:
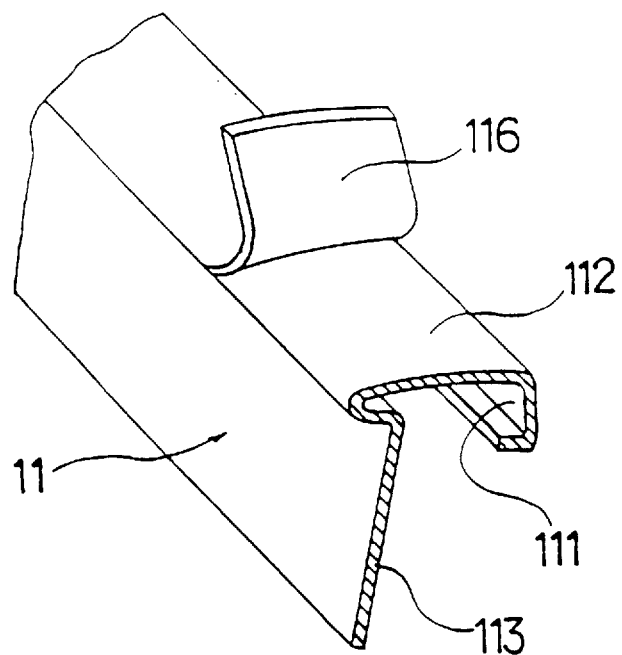

The metal sheet 110 is then formed into the support strip 11 composed of the mounting portion 111, the top portion 112 and the outer piece 113, as shown in FIG. 8, by roll forming (not shown). At this time the support strip 11 has a constant cross-section. The protective film 116 at the top portion is stripped after the continuous forming of the support strip 11.

The adhesive 117 is, in advance, applied to the positions of the support strip 11 at which the resin portions 12 are extrusion molded, as shown in FIG. 9. In other words, the adhesive 117 is applied to the mounting portion 111 and the outer piece 113.

Figure 10:
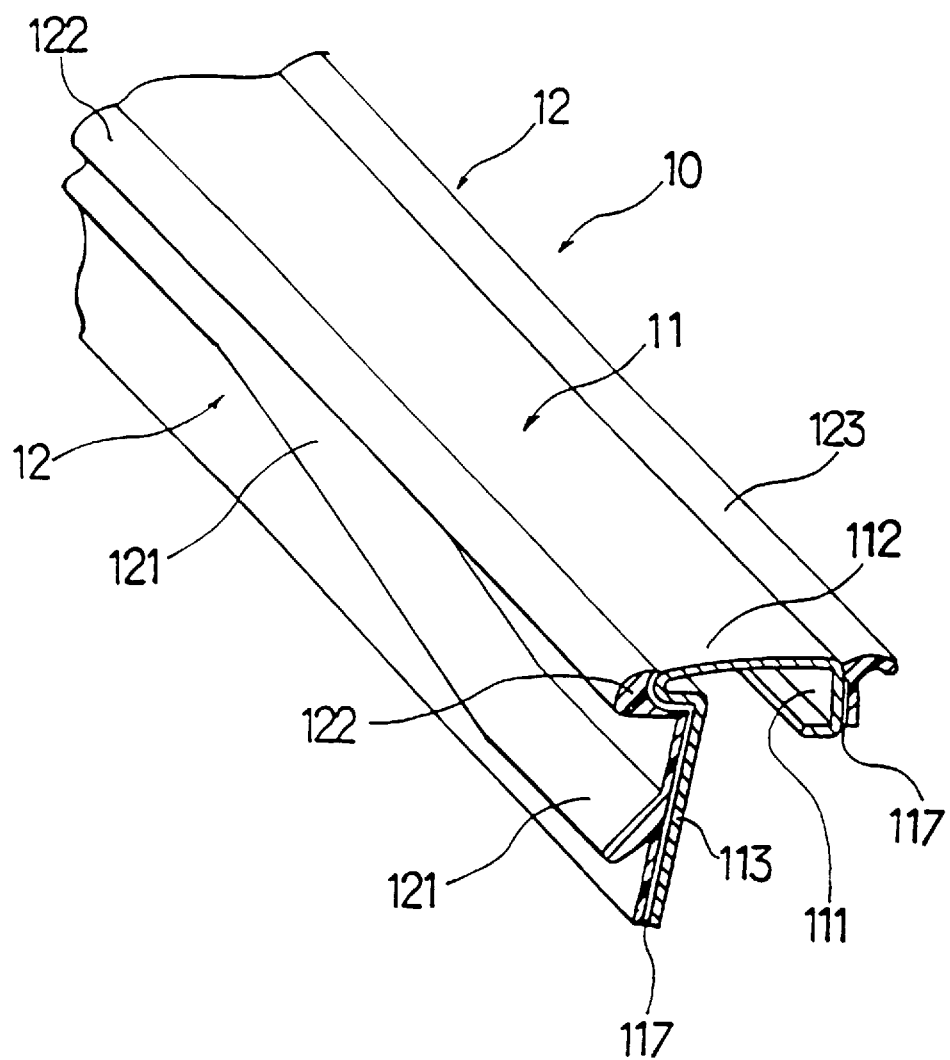

Thereafter, the resin portions 12 are integrally extrusion molded on the support strip 11, as shown in FIG. 10, by using the extrusion die 2 shown in FIG. 12.

At the time of extrusion molding, the support strip 11 is inserted into the main die 21 shown in FIG. 12. The support strip 11 inserted into the main die 21 is extruded from the extrusion orifices 210, 220 with the resin portions 12 integrally extrusion molded on the surfaces of the mounting portion 111 and the outer piece 113. In this way, the lip 123 is formed at the resin portion 12 on the mounting portion 111 of the support strip 11, as shown in FIG. 10. In the outer piece 113 of the support strip 11, the protector 121 is formed at the resin portion 12. At the guide portion 115 of the outer piece 113, the water guide 122 is formed at the resin portion 12.

When the driving motor 25 is driven at the time of extrusion molding, the rotation of the shaft 251 is transmitted to the converter 24. The converter 24 converts the rotational movement of the shaft 251 into the linear movement of the feeding rod 221. With the linear movement of the feeding rod 221, the sub die 22 moves along the die guide 23. The extrusion orifice 220 of the sub die 22 for molding the protector thereby moves along one side of the extrusion orifice 210 of the main die 21.

In this way, it is possible to vary the molding position for the protector 121 in the longitudinal direction of the support strip 11 with respect to the outer piece 113 of the support strip 11.

The thus-extrusion molded molding member 10 is then cut to a predetermined length by using a cutting device (not shown).

Figure 11:
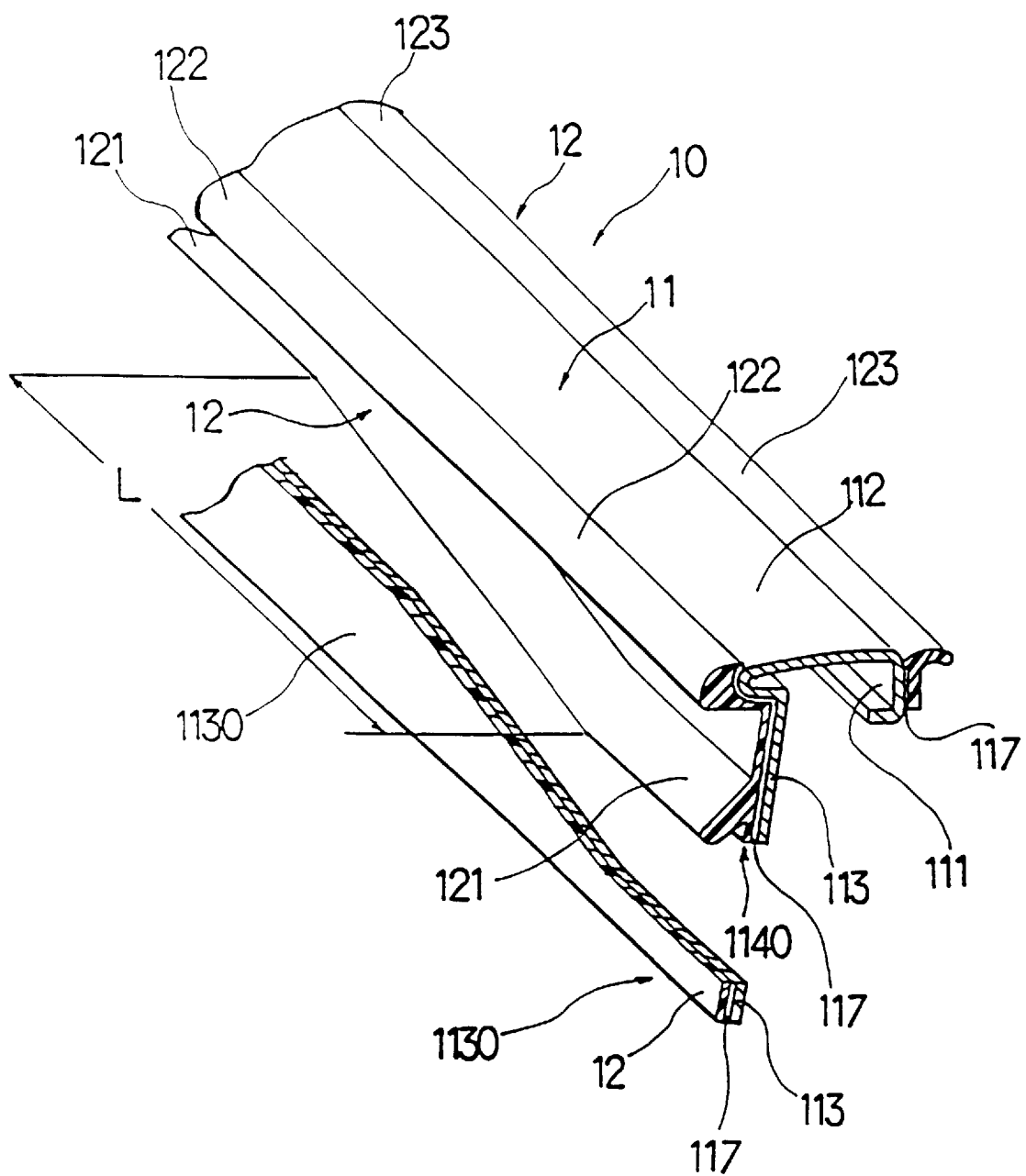

The lower portion 1130 of the outer piece 113 of the support strip 11 is cut off from the molding member 10 along the protector 121, as shown in FIG. 11. At this time, the cutting position for the lower portion 1130 of the outer piece 113 is varied by the height equivalent to the amount H3

(=H2-H1) of movement of the sub die 22 over the length L. A contacting portion 1140 having a predetermined dimension is left below the protector 121. The contacting portion 1140 is bent inwardly so as to form the glass contacting portion 114 and the resin plate portion 1210, as shown in FIG. 1.

In this way, the molding 1 is obtained which has the top portion 112 with a fixed width, the outer piece 113 having a varying height and the resin portions 12 such as the protector, and the cross-section of which varies in the longitudinal direction of the support strip 11, as shown in FIGS. 1 to 5.

The molding 1 obtained in this manner is mounted on a vehicle along the border between the pillar 93 and the window glass 94, as shown in FIG. 6. The lip 123 of the molding 1 comes into elastic contact with the pillar 93 and exhibits a sealing function. The protector 121 comes into elastic contact with the window glass 94 and exhibits a sealing function. The protector 121 and the resin plate portion 1210 prevent the direct contact between the support strip 11 and the window glass 94. The water guide 122 smoothly sheds off rainwater toward the roof during the travel of the vehicle. In FIG. 6, the reference numeral 945 denotes a seal rubber, and 946 a seal member.

Since the protector 121 and the like are integrally provided with the molding 1 by extrusion molding, as described above, no burr is produced unlike in the prior art. The molding 1 of this embodiment has therefore an excellent appearance. The resin portions 12 such as the protector 121 are firmly bonded to the support strip 11 by integral extrusion molding.

In addition, since it is easy to form the protector 121 in the longitudinal direction of the support strip 11 by extrusion molding, great reduction in manufacturing cost is possible in comparison with a conventional method.

As described above, according to this embodiment, it is possible to produce the molding 1 with the cross-section varying in the longitudinal direction without impairing the aesthetic external appearance at an advantageous manufacturing cost.

Embodiment 2

The second embodiment of a molding and a method of producing molding according to the present invention will be explained with reference to FIGS. 13 to 26. The molding of this embodiment is applied to an outer door molding, as shown in FIG. 30.

The molding 3 of this second embodiment is composed of a support strip 31 and a protector 321 provided in the longitudinal direction of the support strip 11, as shown in FIG. 13. The support strip 31 is composed of a mounting portion 311, an outer piece 313 and a top portion 312 for connecting the mounting portion 311 and the outer piece 313. As shown in FIGS. 13 to 16, the height of the outer piece 313 varies along the length of the support strip 31. The protector 321 is produced by bending a protector piece 320 which is integrally extrusion molded on the inner wall surface of the outer piece 313 of the support strip 31 so as to be engaged with the lower portion of the outer piece 313.

The support strip 31 is made of a stainless steel sheet. The support strip 31 has the top portion having a constant width and the outer piece 313 having a varying height, and the cross-section of the support strip 31 varies in the longitudinal direction.

Figure 16:
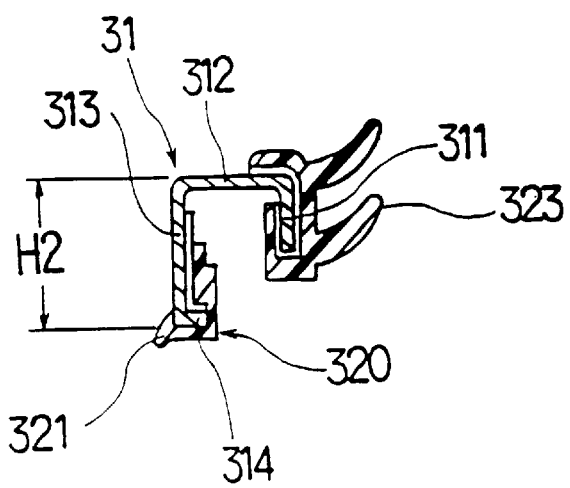

The outer piece 313 has a height of H1, as shown in FIGS. 13 and 14, a height of H2, as shown in FIGS. 13 and 16, and a height varying in the range of H1 to H2 over the length of L, as shown in FIGS. 13 and 15.

The lower portion of the outer piece 313 is bent inwardly so as to form an engaging bent portion 314.

The protector piece 320 is provided at a resin portion 32 along the length of the support strip 31. That is, the molding 3 is composed of the support strip 31 and the resin portions 32 which are integrally extrusion molded with the surfaces of the mounting portion 311 and the outer piece 313 of the support strip 31 through an adhesive 317.

A plurality of lips 323 are provided on the resin portion 32 formed on the mounting portion 311 in such a manner as to project outward from the support strip 31. The lip 323 is provided so as to seal the gap between the molding 3 and a door glass 96.

Figure 25:
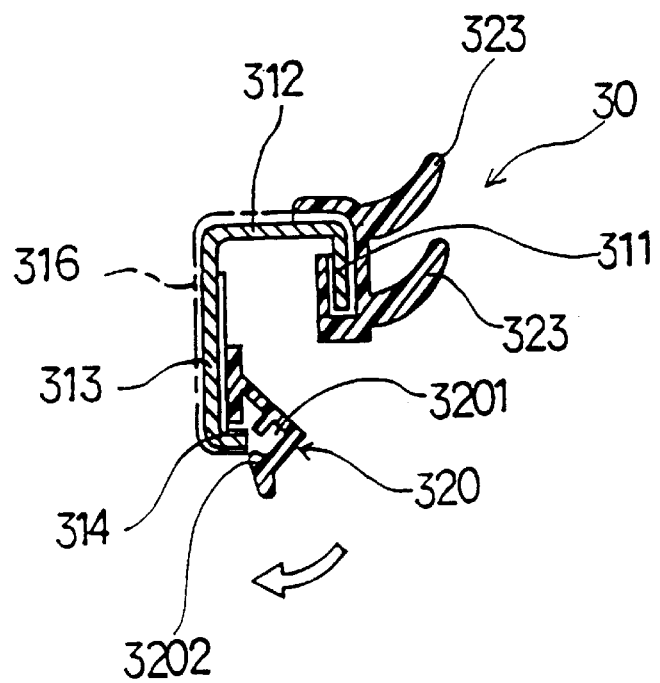

The protector piece 320 is provided, in such a manner as to project inwardly, on the resin portion 32 provided on the inner wall surface of the outer piece 313. The protector piece 320 is engaged with the engaging bent portion 314 at the lower portion of the outer piece 313, thereby forming the protector 321. The protector 321 has a function of sealing the gap between the molding 3 and the door 95 and preventing the direct contact between the support strip 31 and the door 95. The protector piece 320 has an engaging groove portion 3201 which engages the engaging bent portion 314, and a protector portion 3202, as shown in FIGS. 14 and 25.

An extrusion die 4 used for the extrusion molding of the resin portions 32 is shown in FIG. 26. The extrusion die 4 has a main die 41 and a sub die 42 for molding a protector piece. The main die 41 and the sub die 42 have extrusion orifices 410, 420, respectively. The sub die 42 is movable along one side of the extrusion orifice 410 which corresponds to the inner wall surface of the outer piece 313.

The inner surface of the extrusion orifice 410 has the same shape as that of the inside of the mounting portion 311, the top portion 312 and the outer piece 313 of the support strip 31 and the protector piece 320, etc. of the resin portion 32, and the outer surface of the extrusion orifice 410 has the same shape as that of the lip 323, etc. of the resin portion 32.

The main die 41 has on the inside thereof a recessed portion 411 which communicates with one side of the extrusion orifice 410. The recessed portion 411 is longer than the sub die 42 by the length which is equivalent to the amount of movement of the sub die 42. The amount H3 of movement of the sub die 42 is determined by the variation of change in the height of the outer piece 313, namely, (H2-H1).

The sub die 42 is inserted into the recessed portion 411 so as to be movable. A die guide 43 is provided between the main die 41 and the sub die 42 in the direction of the movement of the sub die 42. A feeding rod 421 is extended from the base portion of the sub die 42 in parallel to the direction of the movement of the sub die 42, and the feeding rod 421 is connected to a converter 44. The shaft 451 of a driving motor 45 is connected to the converter 44, and the converter 44 converts the rotation of the shaft 451 into the linear movement of the feeding rod 421. The converting mechanism may use a ball screw, for example, instead.

A method of producing the molding 3 will now be explained with reference to FIGS. 17 to 26.

Figure 17:
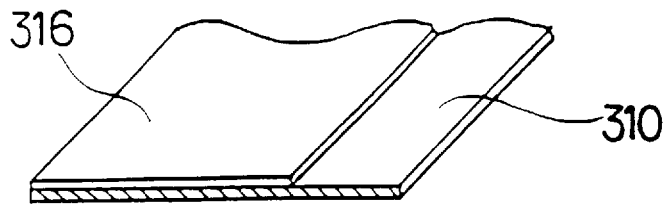

The surface of a metal sheet 310 having a constant width is first partially coated with a protective film 316 as shown in FIG. 17. The protective film 316 protects the surface of the metal sheet 310 during continuous forming and extrusion molding.

Figure 18:
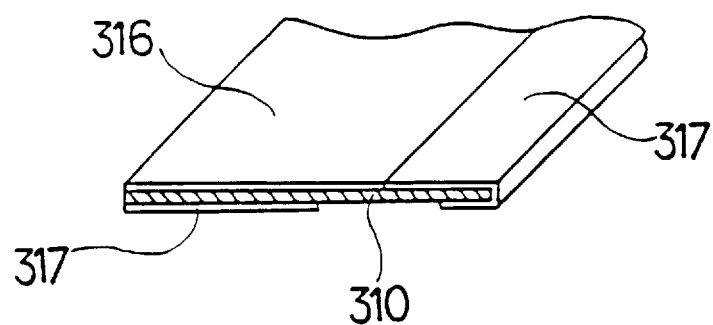

An adhesive sheet 317 is pasted in advance to the surface of the metal sheet 310 at the portion of the support strip 31 on which the resin portion 32 is extrusion molded, as shown in FIG. 18.

The metal sheet 310 is then formed into the support strip 31 composed of the mounting portion 311, the top portion 312 and the outer piece 313, as shown in FIG. 19, by roll forming (not shown). At this time the support strip 31 has a constant cross-section.

Figure 20:
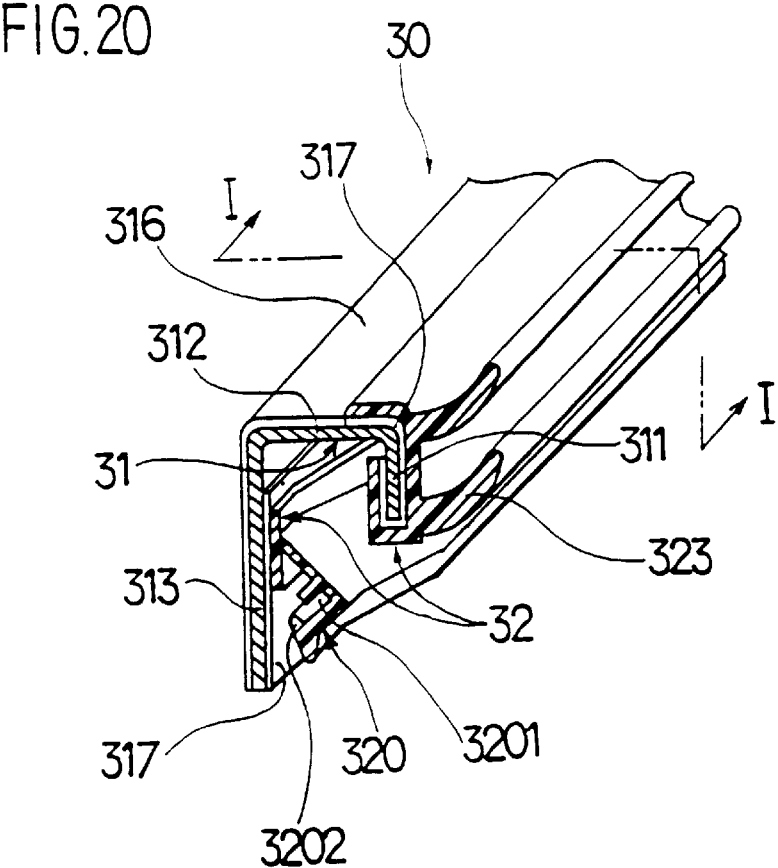
Figure 21:
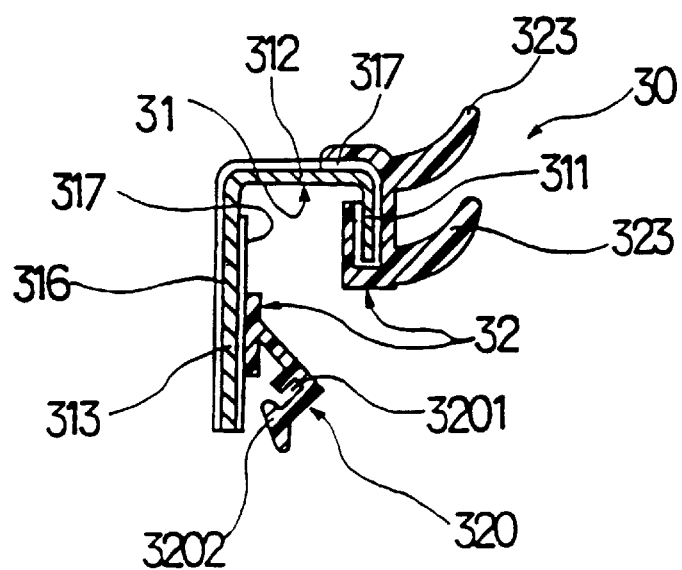

Thereafter, the resin portions 32 are integrally extrusion molded on the support strip 31, as shown in FIGS. 20 and 21, by using the extrusion die 4 shown in FIG. 26.

At the time of extrusion molding, the support strip 31 is inserted into the main die 41 shown in FIG. 26. The support strip 31 inserted into the main die 41 is extruded from the extrusion orifices 410, 420 with the resin portions 32 integrally extrusion molded on the surfaces of the mounting portion 311 and the outer piece 313 by the fusion boding by means of the adhesive sheet 317. In this way, the lip 323 are formed at the resin portion 32 on the mounting portion 311 of the support strip 31, as shown in FIGS. 20 and 21. On the inner wall surface of the outer piece 313 of the support strip 31, the protector piece 320 is formed at the resin portion 32.

When the driving motor 45 is driven at the time of extrusion molding, the rotational movement of the shaft 451 is transmitted to the converter 44. The converter 44 converts the rotational movement of the shaft 451 into the linear movement of the feeding rod 421. With the linear movement of the feeding rod 221, the sub die 42 moves along the die guide 43. The extrusion orifice 420 of the sub die 42 for molding the protector piece thereby moves along one side of the extrusion orifice 410 of the main die 41.

In this way, it is possible to vary the molding position for the protector piece 320 in the longitudinal direction of the support strip 31 with respect to the outer piece 313 of the support strip 31.

The thus-extrusion molded protector piece 320 assumes the state of extending obliquely downwardly from the inner wall surface of the outer piece 313, as shown in FIGS. 20 and 21. The protector piece 320 is provided with the engaging groove portion 3201 and the protector portion 3202.

The thus-extrusion molded molding member 30 is then cut to a predetermined length by using a cutting device (not shown).

Figure 22:
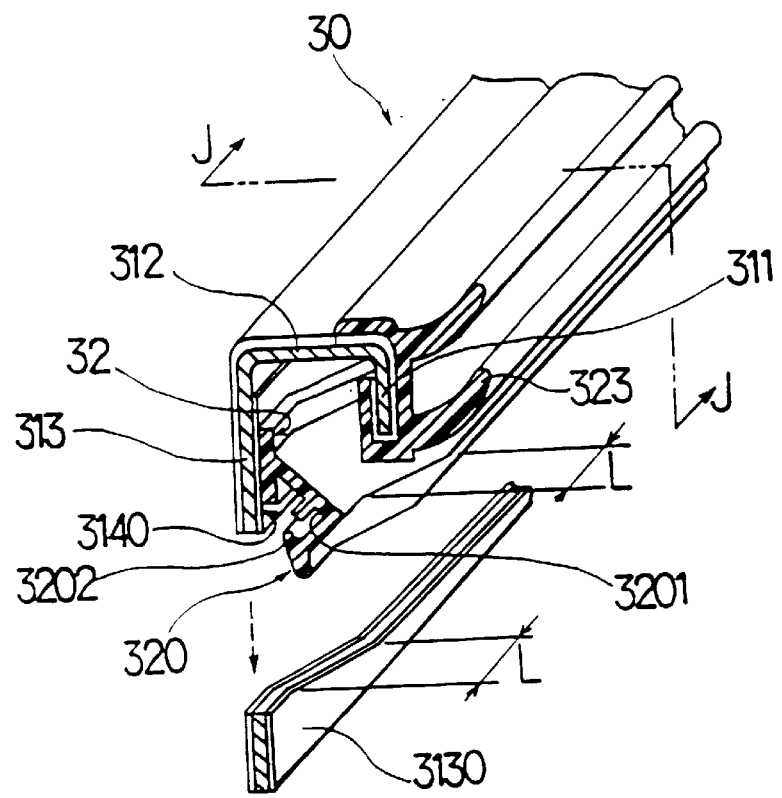
Figure 23:
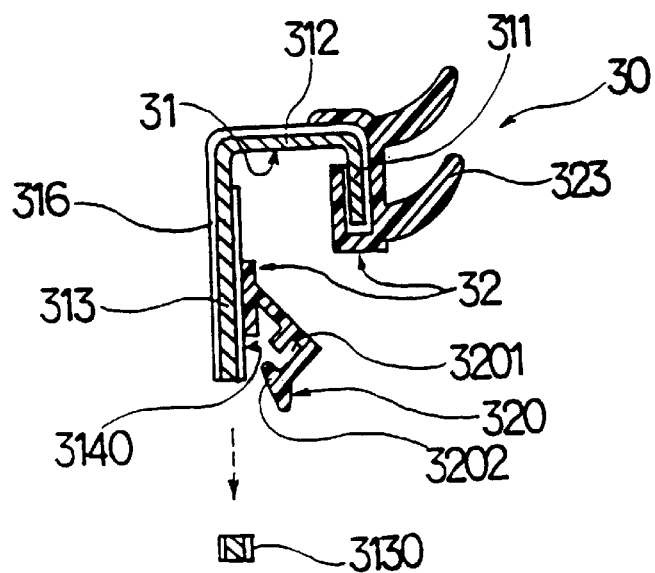
Figure 24:
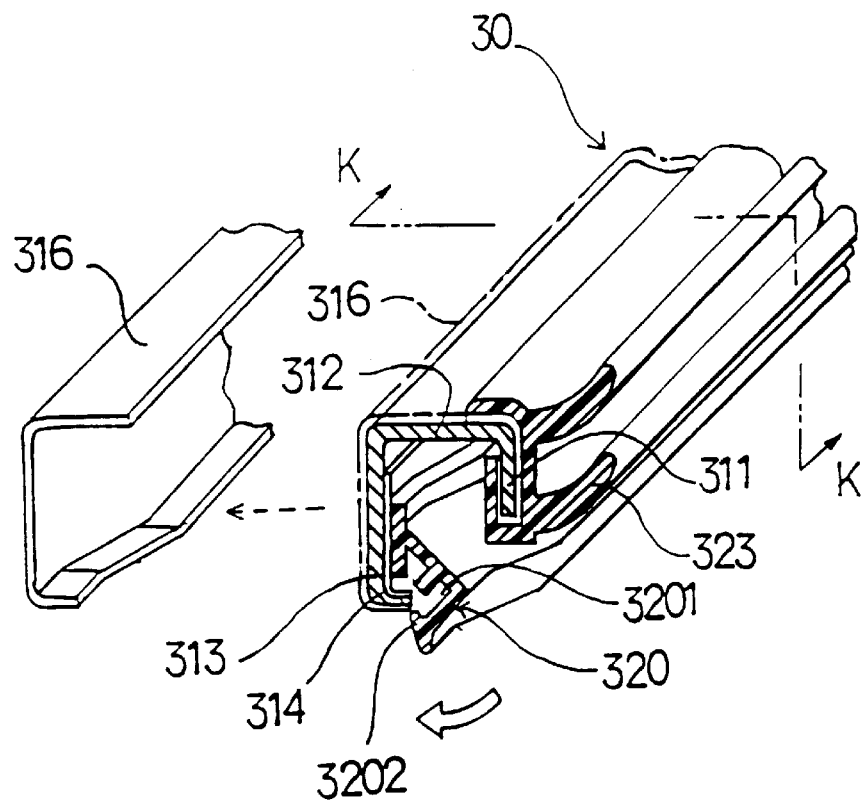

The lower portion 3130 of the outer piece 313 of the support strip 31 is cut off from the molding member 30 along the protector piece 320, as shown in FIGS. 22 and 23. At this time, the cutting position for the lower portion 3130 of the outer piece 313 is varied by the height equivalent to the amount H3 (=H2-H1) of movement of the sub die 42 over the length L. An engaging portion 3140 having a predetermined dimension is left below the resin portion 32 on which the protector piece 320 is formed. The engaging portion 3140 is bent inwardly so as to form the engaging bent portion 314 below the outer piece 313, as shown in FIGS. 24 and 25.

The protective film 316 is then stripped off. A "shining ornamental surface" is formed on the outer piece 313 at the portion from which the protective film 316 is stripped. The protector piece 320 is bent in such a manner as to be engaged with the engaging bent portion 314, thereby forming the protector 321.

At this time as shown in FIG. 14, the end portion of the engaging bent portion 314 engages with the engaging groove portion 3201 of the protector piece 320 so as to regulate the vertical movement of the protector piece 320. The bent angle portion of the engaging bent portion 314 engages with the protector portion 3202 of the protector piece 320 so as to regulate the horizontal movement of the protector piece 320. The protector portion 3202 constitutes the protector 321 after the protector piece 320 has engaged the engaging bent portion 314.

In this way, the molding 3 is obtained which has the top portion 312 with a fixed width, the outer piece 313 having a varying height and the resin portions 32 such as the protector, and the cross-section of which varies in the longitudinal direction of the support strip 31, as shown in FIGS. 13 to 16.

The molding 3 obtained in this manner is mounted on a vehicle along the border between the door 95 and the door glass 92, as shown in the prior art in FIG. 30. The lip 323 of the molding 3 comes into elastic contact with the door glass 92 and exhibits a sealing function. The protector 321 comes into elastic contact with the door glass 95 and exhibits a sealing function. The protector 321 also prevents the direct contact between the support strip 31 and the door 95.

Since the protector 321 and the like are integrally provided with the molding 3 by extrusion molding, as described above, no burr is produced unlike in the prior art. In the molding 3, a "shining ornamental surface" is formed on the surface of the support strip 31, particularly, the outer piece 313. The molding 3 of this embodiment has therefore an excellent external appearance. The resin portions 32 such as the protector 321 are firmly bonded to the support strip 31 by integral extrusion molding.

In addition, since it is easy to form the protector 321 in the longitudinal direction of the support strip 31, great reduction in manufacturing cost is possible in comparison with a conventional method.

As described above, according to this embodiment, it is possible to produce the molding 3 with the cross-section varying in the longitudinal direction without impairing the aesthetic external appearance at an advantageous manufacturing cost.

Embodiment 3

The third embodiment of a molding and a method of producing the molding according to the present invention will be explained with reference to FIGS. 27 to 29. The molding of this embodiment is applied to an window molding, as shown in FIG. 30.

Figure 27:
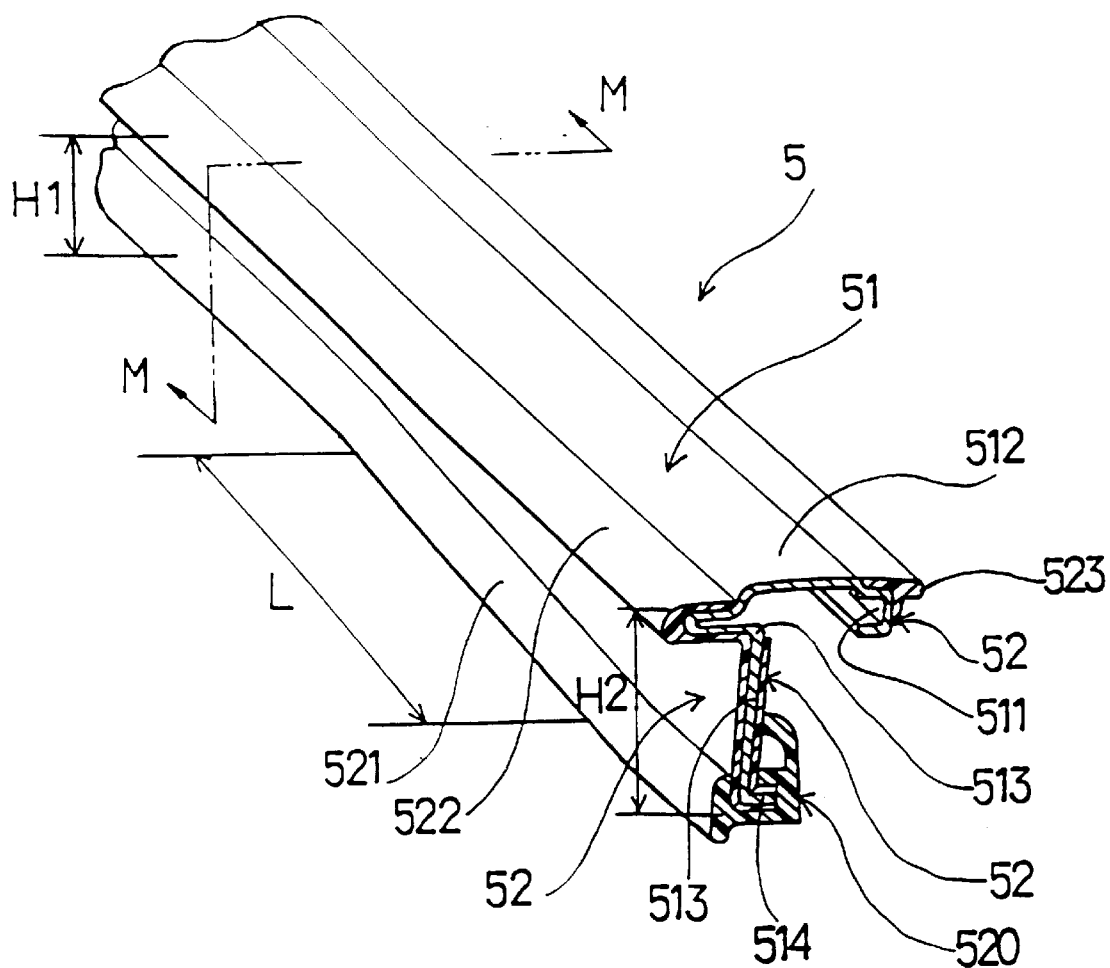

The molding 5 of this third embodiment is composed of a support strip 51 and resin portions 52, and a protector 521 is provided on the resin portion 52 in the longitudinal direction of the support strip 51, as shown in FIG. 27. The support strip 51 is composed of a mounting portion 511, an outer piece 513 and a top portion 512 for connecting the mounting portion 511 and the outer piece 513. As shown in FIGS. 27 to 28, the height of the outer piece 513 varies along the length of the support strip 51. The protector 521 is produced by bending a protector piece 520 which is integrally extrusion molded on the inner wall surface of the outer piece 513 of the support strip 51 so as to engage the lower portion of the outer piece 513.

In this way, the molding 5 has the same structure as the molding 3 of the second embodiment and the manufacturing method and the advantages which the molding 5 brings about are also the same.

The molding 5 of this embodiment is the most different from the molding 3 in that a water guide 522 is provided at the upper portion of the outer piece 513. The water guide 522 is provided on the resin portion 52. Since the resin portion 52 is made of an ionomer resin, the adhesive sheet 317 in the second embodiment is dispensed with.

The molding 5 is mounted on a vehicle along the border between the pillar 93 and the window glass 94, as shown in the prior art in FIG. 30. The water guide 522 smoothly sheds off rainwater toward the roof during the travel of the vehicle.

Figure 29:
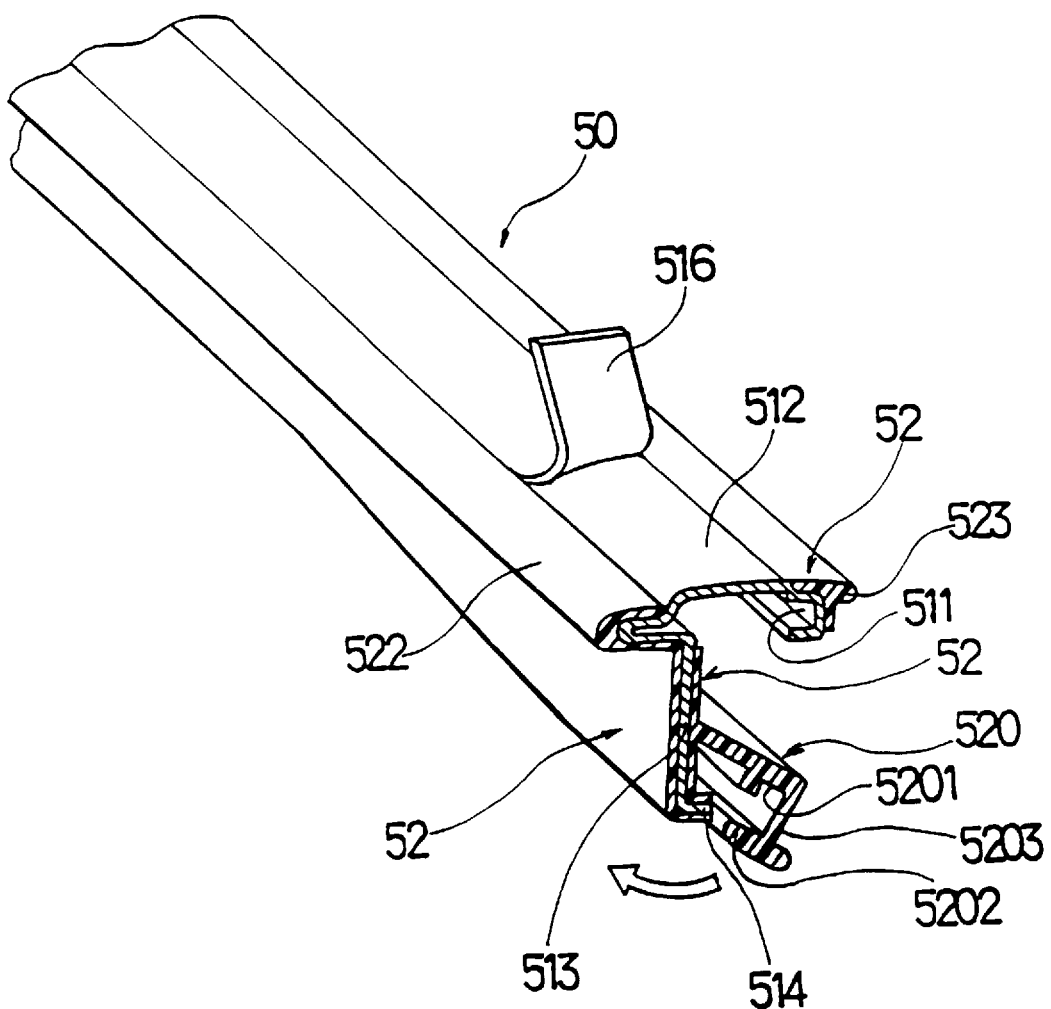

The protector piece 520 has a resin plate 5203 which is integrally molded with the protector 521, as shown in FIGS. 28 and 29. The protector piece 520 also has the function of a contacting member. Therefore, the protector piece 520 enhances sealing property for the gap between the molding 5 and the window glass 94 and prevents the window glass 94 from being damaged.

Other advantages are the same as in the second embodiment.

In FIGS. 27 to 29, the reference numeral 523 denotes a lip, 5201 an engaging groove portion, 5202 a protector portion, 514 an engaging bent portion and 516 a protective film for protecting a "shining ornamental surface". These elements are the same as those in the second embodiment.

Embodiment 4

The fourth embodiment of a molding and a method of producing the molding according to the present invention will be explained with reference to FIGS. 30 to 36. The molding of this embodiment is applied to a window molding, as shown in FIG. 30.

The molding 100 at this fourth embodiment is composed of a support strip 11, a protector 121 and a water guide 122 provided in the longitudinal direction of the support strip 11. The support strip 11 is composed of a mounting portion 111, an outer piece 113, and a top port ion 112 for connecting the mounting portion 111 and the outer piece 113.

As shown in FIGS. 30 to 36, the outer piece 113 has the same height along the length of the molding. The protector 121 is so integrally provided with the outer wall of the outer piece 113 that the height between the protector 121 and the upper end of the outer piece 113 is gradually decreased. In other words, as shown in FIG. 32, the height H5 between the lower end 1145 and the upper end of the outer piece 113 is the same at any portion of the nolding. While the height H2 at the front side of the molding between the protector 121 and the upper end of the outer piece 113 is gradually decreased to the height H1 at the back side of the molding as shown in FIGS. 30 and 31. It follows as a consequence that the height between the lower end 1145 of the outer piece 113 and the protector 121 is gradually increased from the front to the back sides of the molding over its length, as shown in FIGS. 30 to 32. Other constructions are the same as those described in Embodiment 1.

The molding 100 of this embodiment is obtained from the process for cutting the molding that has been extrusion molded to a predetermined length, requiring no further process for cutting the lower portion of the outer piece 113, as shown in FIG. 11, of the producing method described in Embodiment 1. The molding obtained from the method according to this embodiment is substantially the same as that obtained from Embodiment 1 as shown in FIG. 10.

This fourth embodiment, thus, provides the same effects as those of Embodiment 1.

Embodiment 5

The fifth embodiment of a molding and a method of producing the molding according to the present invention will be explained with reference to FIGS. 37 to 43. The molding of this embodiment is applied to a window molding, as shown in FIG. 37.

Figure 37:
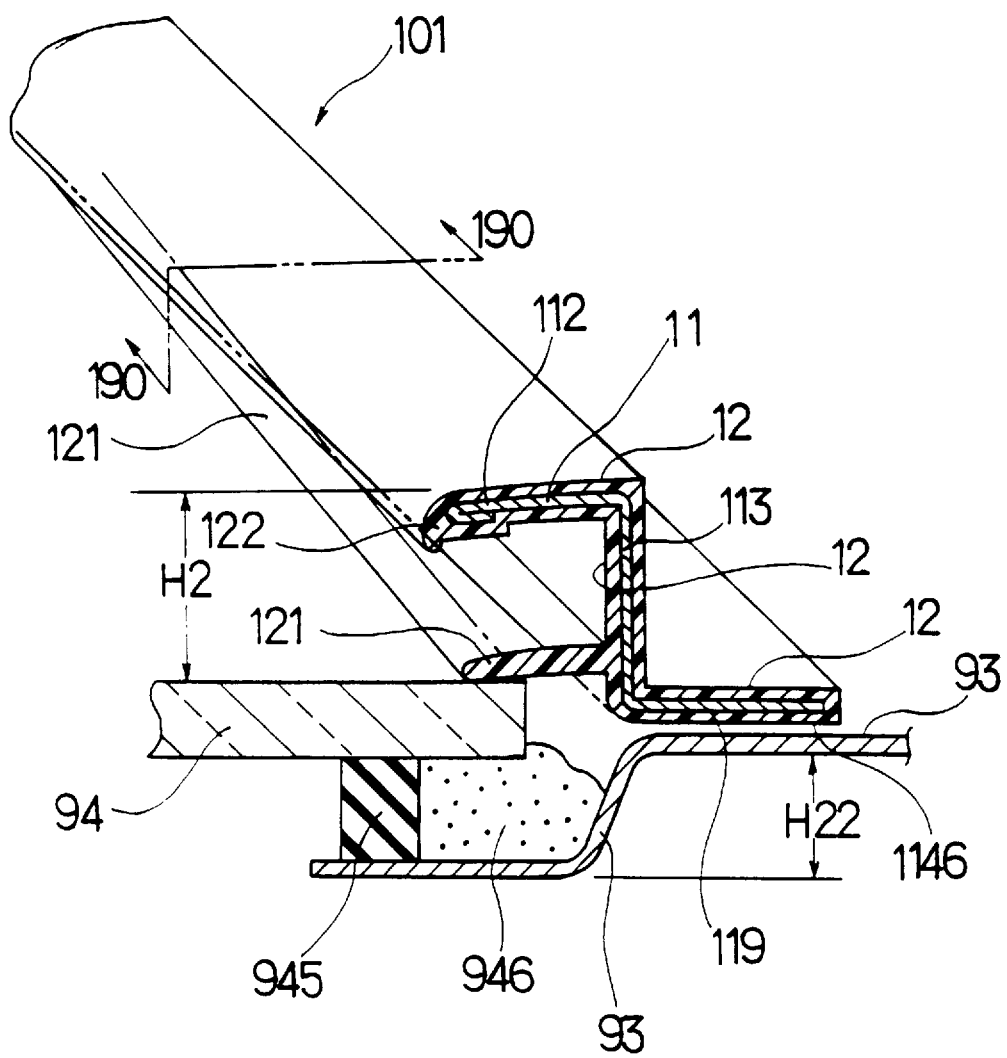
Figure 40:
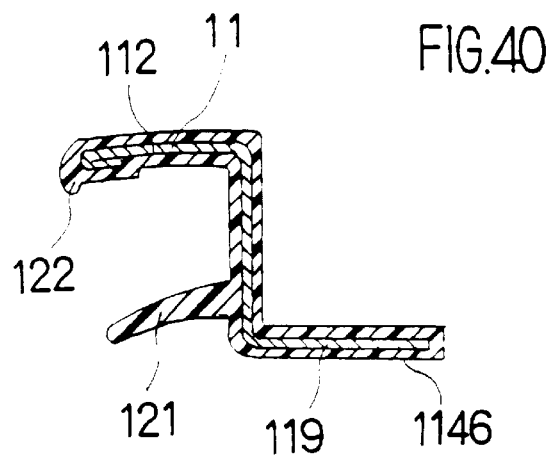
Figure 41:
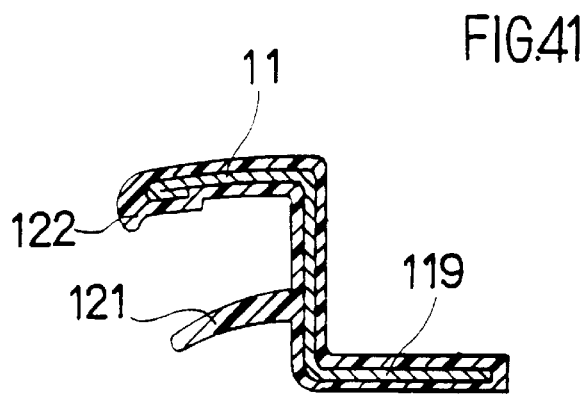
Figure 42:
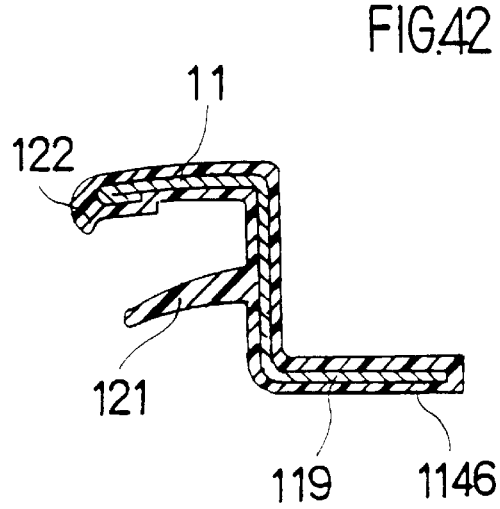
Figure 43:
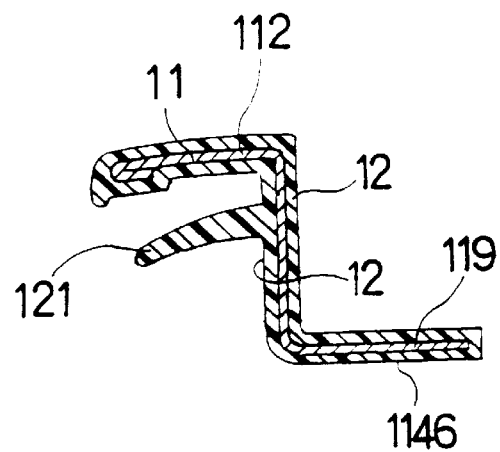
Figure 44:
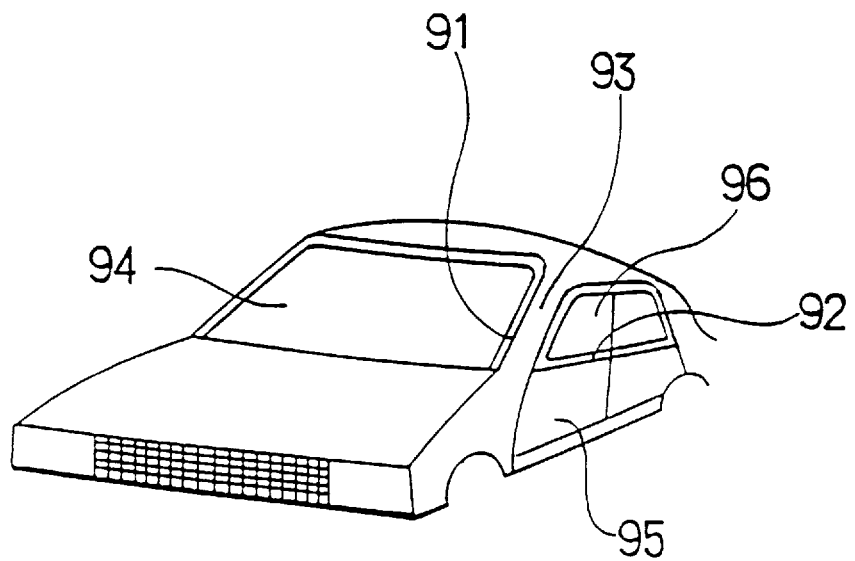
Figure 45:
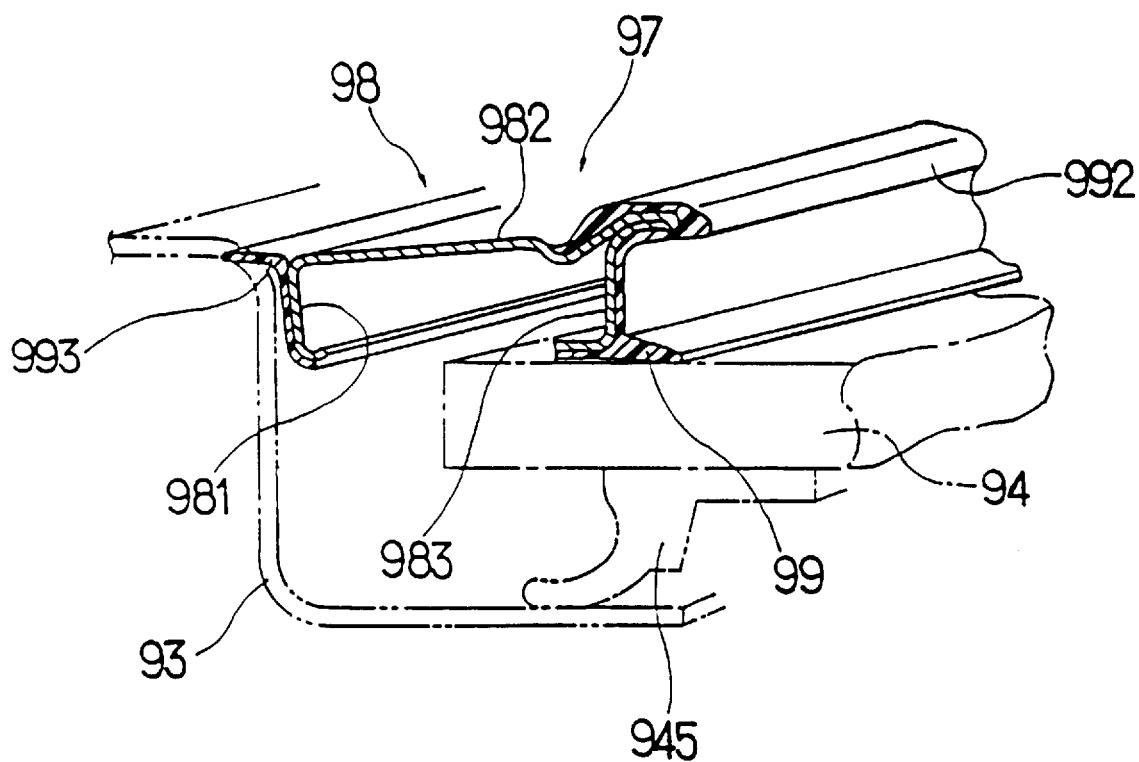
Figure 49:
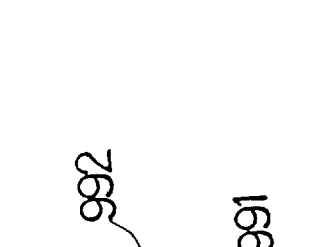
Figure 48:
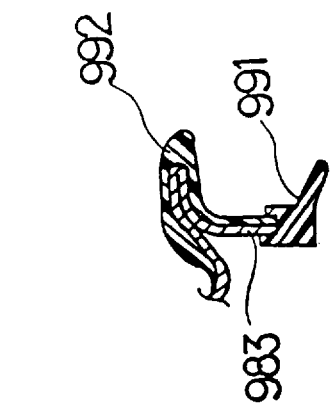
Figure 46:
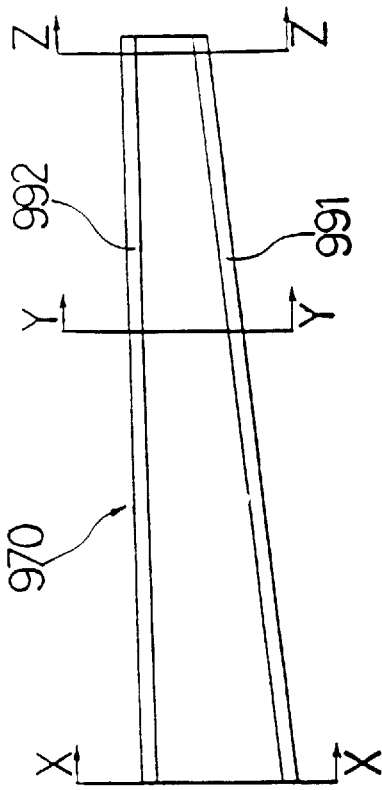
Figure 47:
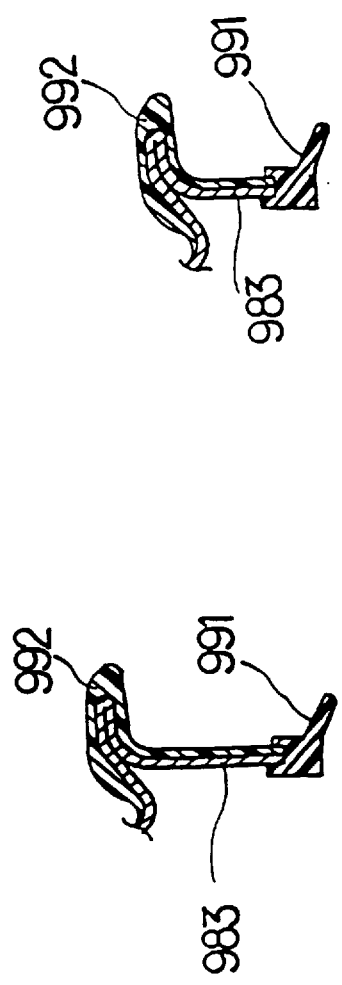
Figure 1:
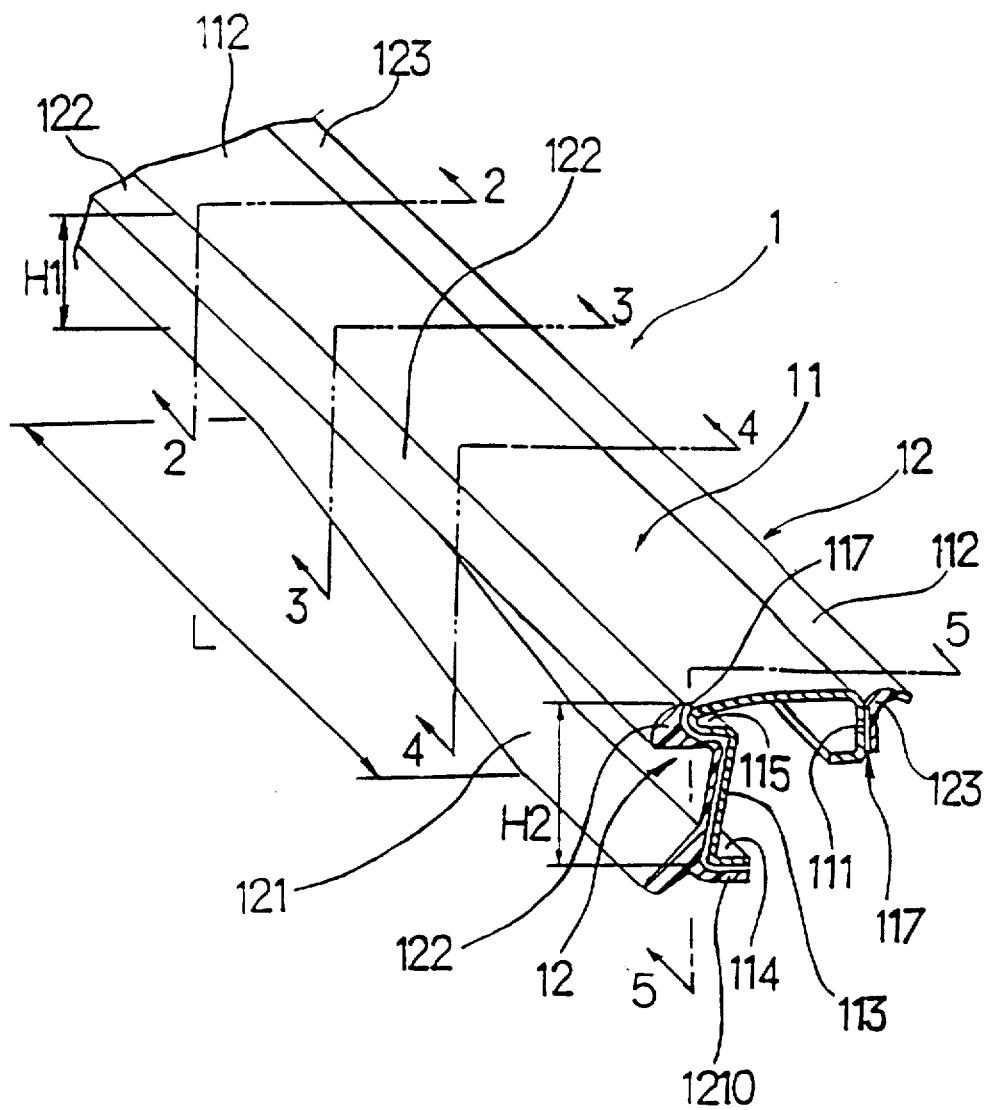

The molding 101 at this fifth embodiment is composed of a support strip 11, a protector 121 and a water guide 122 provided in the longitudinal direction of the support strip 11 as shown in FIGS. 37 and 38. The support strip 11 is formed to have a substantially Z-shaped cross-section, and is composed of a top portion 112, an outer piece 113, and a mounting portion 119. A resin portion 12 is integrally extrusion molded with the surface of the support strip 11.

As shown in FIGS. 37 to 43, the outer piece 113 has the same height along the length of the molding. The protector 121 is so integrally provided with the outer wall of the outer piece 113 that the height between the protector 121 and the upper end of the outer piece 13 is gradually decreased.

As shown in FIG. 39, the height H6 between the lower end 1146 and the upper end of the outer piece 113 is the same at any portion of the molding. While the height between the protector 121 and the upper end of the outer piece 113 is gradually decreased from the height H2 at the front side to H1 at the back side of the molding as shown in FIGS. 37 and 38. It follows that, as shown in FIGS. 37 to 39, the height between the lower end surface 1146 of the outer piece 113 and the protector 121 is gradually increased from the front to the back sides of the molding along its length.

The mounting portion 119 is fixed to a pillar 93 with, for example, a screw and the like (not shown). Since the height between lower end surface 1146 of the mounting portion 119 and the protector 121 varies along the length of the molding as aforementioned, the height of the pillar 93 is gradually decreased from H22 at the front to H11 at the back sides of the molding as shown in FIGS. 37 and 38. Other constructions are the same as those described in Embodiment 1.

The molding 101 of this embodiment is obtained from extrusion molding, using the same method of Embodiment 1.

Like Embodiment 4, the method for producing the molding in this embodiment requires no process for cutting the lower portion of the outer piece 113.

The molding 101, thus, is obtained from forming the protector 121, the water guide 122 and the resin portion 12 by integrally extrusion molding to the surface of the support strip 11.

While there has been described what are at present considered to be preferred embodiments of the invention, it will be understood that various modifications may be made thereto, and it is intended that the appended claims cover all such modifications as fall within the true spirit and scope of the invention.

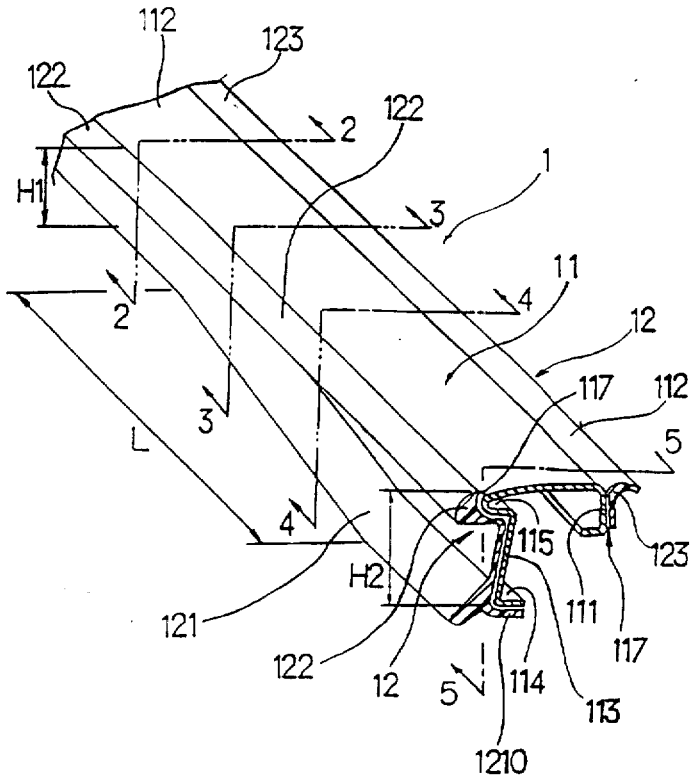

What is claimed is:

1. A molding for an automobile which is mounted between a pillar of the automobile body and a window glass of the automobile, said molding comprising:
   a protector in contact with a surface of the window glass;
   a water guide spaced from said protector such that an open channel is defined between said water guide and said protector, and wherein said channel is open toward a center of said window glass; and
   wherein a gap between said protector and said water guide gradually decreases in size toward an upper portion of said window, and wherein said protector and said water guide are monolithically molded by extrusion molding.

2. A molding as recited in claim 1, wherein said protector includes a first portion extending toward the center of said window glass and a second portion extending toward a side edge of said window glass.

3. A molding as recited in claim 2, further including a support strip, and wherein said second portion of said protector is disposed between said support strip and said window glass.

4. A molding as recited in claim 3, wherein said support strip includes an outer piece which extends along a length of said channel, said support strip further including a mounting portion and a top portion, said top portion extending between said outer piece and said mounting portion.

5. A molding as recited in claim 4, further including a lip connected to said mounting portion of said support strip, said lip projecting from the support strip to seal a gap between said support strip and the pillar of the automobile body.

6. A molding as recited in claim 1, wherein said protector includes a first portion extending toward the center of the window glass and wherein said molding further includes a second portion extending from said first portion and over a side edge of the window glass, and further wherein said first portion and said second portion are monolithically molded by extrusion molding.

7. A molding as recited in claim 1, further including a support strip connected to said protector and said water guide, said support strip including a mounting portion connected to the pillar of the automobile.

8. A molding as recited in claim 1, further including a support strip connected to said protector and said water guide, said support strip including an outer piece disposed such that said channel extends along a length portion of said outer piece, and wherein said support strip further includes a mounting portion and a top portion, said outer piece extending between said top portion and said mounting portion.

9. A molding as recited in claim 8, wherein a height of said outer piece extends between said mounting portion and said top portion, and said protector is disposed at a varying height location with respect to said outer piece along said length portion of said outer piece.

10. A molding as recited in claim 9, wherein said height of said outer piece is constant along said length portion of said outer piece.

11. A molding as recited in claim 1, wherein a base portion of said molding extends between said protector and said water guide, and wherein said protector, said base portion and said water guide delimit said open channel.

12. A molding for an automobile which is to be mounted between the automobile body and a window glass of the automobile comprising:

a protector which contacts a surface of the window glass;

a water guide spaced from said protector;

a base portion extending between said protector and said water guide, said base portion having a width which varies along a longitudinal direction of the molding;

wherein said protector and said water guide each include portions extending from said base portion toward a center of the window glass, and further wherein said base portion, said protector and said water guide delimit an open channel which opens toward a center of said window glass.

13. A molding for an automobile as recited in claim 12, wherein said width of said base portion is in a direction extending between said protector and said water guide, and wherein said width decreases in size along the longitudinal direction of said molding to thereby provide a decreasing spacing between said protector and said water guide.

14. A molding for an automobile as recited in claim 12, wherein said protector includes a first portion extending in a first direction and a second portion extending in a second direction substantially opposite to said first direction, wherein said base portion of said molding extends from a location substantially between said first and second portions of said protector, and wherein said base portion extends in a direction transverse to said first and second directions, and further wherein said first direction extends toward a center of the window glass and said second direction extends toward a side edge of the window glass.

15. A molding for a window as recited in claim 12, further including a support strip, said support strip including an outer piece, a mounting portion and a top portion, said top portion extending between said outer piece and said mounting portion, and wherein said outer piece of said support strip extends along said base portion.

16. A molding as recited in claim 15, further including a lip member connected to said mounting portion of said support strip.

17. A molding as recited in claim 16, wherein said protector, said base portion, and said water guide are monolithically molded by extrusion molding.

18. A molding as recited in claim 17, wherein said outer piece of said support strip includes a first bent portion which is bent in a first direction, said first bent portion disposed adjacent to said protector, said outer piece further including a second bent portion bent in a direction opposite to said first direction, and wherein said second bent portion is disposed adjacent to said water guide.

19. A molding as recited in claim 15, wherein said protector, said water guide, and said base portion are monolithically molded by extrusion molding, and wherein said support strip is formed of a different material than that of said protector, said water guide, and said base portion.

* * * * *

UNITED STATES PATENT AND TRADEMARK OFFICE
CERTIFICATE OF CORRECTION

PATENT NO. : 5,804,118
DATED : September 8, 1998
INVENTOR(S) : Yukihiko Yada, et al.

It is certified that error appears in the above-identified patent and that said Letters Patent is hereby corrected as shown below:

The title page, showing the illustrative figure, should be deleted and substitute therefor the attached title page.

The drawing sheet, consisting of Fig. 1, should be deleted to be replaced with the drawing sheet, consisting of Fig. 1, as shown on the attached page.

Signed and Sealed this

Twenty-first Day of November, 2000

Attest:

Q. TODD DICKINSON

Attesting Officer

Director of Patents and Trademarks

United States Patent [19]
Yada et al.

[11] Patent Number: 5,804,118
[45] Date of Patent: Sep. 8, 1998

[54] MOLDING AND METHOD OF PRODUCING THE SAME

[75] Inventors: Yukihiko Yada; Kazuyoshi Higuchi, both of Oobu, Japan

[73] Assignee: Tokai Kogyo Kabushiki Kaisha, Oobu, Japan

[21] Appl. No.: 637,172

[22] Filed: Apr. 24, 1996

Related U.S. Application Data

[62] Division of Ser. No. 130,392, Oct. 1, 1993, Pat. No. 5,534,316, which is a division of Ser. No. 781,374, Oct. 23, 1991, Pat. No. 5,281,291.

[30] Foreign Application Priority Data

| Oct. 24, 1990 | [JP] | Japan | 2-286708 |
| Nov. 8, 1990 | [JP] | Japan | 2-304884 |

[51] Int. Cl.$^6$ .................................................. D01D 5/20
[52] U.S. Cl. .................. 264/167; 264/177.1; 264/177.2; 52/708; 52/400; 52/716.5
[58] Field of Search ................... 49/479, 373, 374, 49/488, 490; 296/93, 201, 208; 52/208, 400, 716, 397, 402, 403, 718.1, 716.2, 716.4, 716.5; 264/177.1, 177.2, 167, 40.7, 177.17, 117.1

[56] References Cited

U.S. PATENT DOCUMENTS

| 4,894,954 | 1/1990 | Nozaki et al. | 49/479 |
| 4,963,403 | 10/1990 | Roberts et al. | 428/31 |
| 5,139,302 | 8/1992 | Kauke | 296/93 |
| 5,174,624 | 12/1992 | Yada et al. | 296/93 |
| 5,344,205 | 9/1994 | Yada et al. | 296/93 |
| 5,523,041 | 6/1996 | Yada | 264/167 |

*Primary Examiner*—Merrick Dixon
*Attorney, Agent, or Firm*—Oblon, Spivak, McClelland, Maier & Neustadt, P.C.

[57] ABSTRACT

A molding with the cross-section thereof varying in the longitudinal direction. The molding includes: a support strip; and a protector provided along the length of the support strip so as to bring the molding into contact with a window glass; the support strip including a mounting portion, an outer piece with the height thereof varying along the length of the support strip and a top portion for connecting the mounting portion and the outer piece; and the protector being integrally provided with the outer piece of the support strip at the lower portion thereof by extrusion molding.

19 Claims, 25 Drawing Sheets